US010891919B2

(12) United States Patent
Hong

(10) Patent No.: US 10,891,919 B2
(45) Date of Patent: Jan. 12, 2021

(54) DISPLAY SYSTEM AND IMAGE DISPLAY METHOD

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/313,579

(22) PCT Filed: May 10, 2018

(86) PCT No.: PCT/CN2018/086317
§ 371 (c)(1),
(2) Date: Dec. 27, 2018

(87) PCT Pub. No.: WO2019/001145
PCT Pub. Date: Jan. 3, 2019

(65) Prior Publication Data
US 2019/0304400 A1    Oct. 3, 2019

(30) Foreign Application Priority Data
Jun. 26, 2017 (CN) .......................... 2017 1 0495394

(51) Int. Cl.
*G09G 5/10* (2006.01)
*G02B 27/01* (2006.01)
(Continued)

(52) U.S. Cl.
CPC .............. *G09G 5/10* (2013.01); *G02B 5/3025* (2013.01); *G02B 27/01* (2013.01);
(Continued)

(58) Field of Classification Search
CPC ........ G09G 5/10; G02B 5/3025; G02B 27/01; G02B 27/017; G02B 27/28; G02B 27/283; G02B 2027/0118
See application file for complete search history.

(56) References Cited

U.S. PATENT DOCUMENTS 9,389,422 B1    7/2016  Cakmakci et al.
2007/0159673 A1* 7/2007  Freeman .............. G02B 5/1814
                                                              359/19

(Continued)

FOREIGN PATENT DOCUMENTS

CN        102165357 A    8/2011
CN        102830490 A    12/2012
(Continued)

OTHER PUBLICATIONS

International Search Report and Written Opinion dated Aug. 8, 2018.

*Primary Examiner* — Sardis F Azongha
(74) *Attorney, Agent, or Firm* — Dilworth & Barrese, LLP.; Michael J. Musella, Esq.

(57) ABSTRACT

A display system and an image display method are disclosed. The display system includes a display image export device, a display image import device and a light intensity control device. The display image export device includes a display side and an opposite side; at least part of the display image export device is able to receive at least part of a surrounding image for the opposite side at the display side; and the display image export device can further display a first image at the display side. The display image import device can receive light of the first image, and to transmit the tight of the first image to the display image export device. The light intensity control device can control at least one of
(Continued)

an intensity of light of the surrounding image and an intensity of the light of the first image.

17 Claims, 9 Drawing Sheets

(51) Int. Cl.
  *G02B 5/30* (2006.01)
  *G02B 27/28* (2006.01)
(52) U.S. Cl.
  CPC ......... *G02B 27/0172* (2013.01); *G02B 27/28* (2013.01); *G02B 27/283* (2013.01); *G02B 2027/0118* (2013.01); *G02B 2027/0178* (2013.01); *G09G 2360/144* (2013.01); *G09G 2360/145* (2013.01)

(56) References Cited

U.S. PATENT DOCUMENTS

| | | | |
|---|---|---|---|
| 2012/0001833 A1 | 1/2012 | Lindig et al. | |
| 2012/0320100 A1 | 12/2012 | Machida et al. | |
| 2013/0108229 A1* | 5/2013 | Starner | G02B 27/01 385/119 |
| 2015/0070596 A1* | 3/2015 | Gadjali | G02B 27/0172 349/11 |
| 2016/0018645 A1* | 1/2016 | Haddick | G02B 27/0172 345/8 |
| 2017/0219827 A1* | 8/2017 | Pan | G02B 27/0172 |

FOREIGN PATENT DOCUMENTS

| | | |
|---|---|---|
| CN | 103946732 A | 7/2014 |
| CN | 207020398 U | 2/2018 |
| WO | 2013049248 A2 | 4/2013 |
| WO | 2016114130 A1 | 7/2016 |
| WO | 2016174843 A1 | 11/2016 |

* cited by examiner

DISPLAY SYSTEM AND IMAGE DISPLAY METHOD

TECHNICAL FIELD

Embodiments of the present disclosure relates to a display system and an image display method.

BACKGROUND

An augmented Reality (AR) display system can achieve fusion of a virtual scene and a reality scene outside the display system through superimposing the virtual scene on the reality scene outside the display system. Therefore, an augmented reality display system can enhance users' cognitive ability to the real world, and improve the users' experience significantly. Because of the advantages of light weight, small volume and small thickness, the augmented reality display systems based on an optical waveguide have attracted widespread attention.

SUMMARY

At least one embodiment of the present disclosure provides a display system, and the display system comprises a display image export device, a display image import device and a light intensity control device. The display image export device comprises a display side and an opposite side which is opposite to the display side; at least part of the display image export device is configured to be at least partially transparent, so as to, at the display side of the display image export device, receive at least part of a surrounding image for the opposite side; and the display image export device is further configured to display a first image at the display side. The display image import device is configured to receive light of the first image, and to transmit the light of the first image to the display image export device. The light intensity control device is configured to control at least one of an intensity of light of the surrounding image and an intensity of the light of the first image.

For example, in the display system provided by at least one embodiment of the present disclosure, the light intensity control device comprises a light intensity detection device and a light transmission control device. The light intensity detection device is provided at the display side of the display image export device, and is configured to collect the light of the surrounding image and the light of the first image. The light transmission control device is configured to control the intensity of the light of the surrounding image and/or the intensity of the light of the first image, the light of the surrounding image and the light of the first image being incident onto the light intensity detection device at different time, so as to allow the light intensity detection device to obtain the intensity of the light of the surrounding image and the intensity of the light of the first image.

For example, in the display system provided by at least one embodiment of the present disclosure, the light transmission control device comprises a first polarizer and a first polarization control element. The first polarizer is configured to convert the light of the first image or the light of the surrounding image in the display image export device to be first linear polarized light; and the first polarization control element is provided between the display image export device and the light intensity detection device. The first polarization control element is configured to transmit the first linear polarized light and to block second linear polarized light, so as to allow the first linear polarized light to be incident onto the light intensity detection device, or the first polarization control element is configured to transmit second linear polarized light and to block the first linear polarized light, so as to allow the second linear polarized light to be incident onto the light intensity detection device; and a polarization direction of the second linear polarized light is perpendicular to a polarization direction of the first linear polarized light.

For example, in the display system provided by at least one embodiment of the present disclosure, the light transmission control device further comprises a second polarizer; the first polarizer is provided at the display side, the first polarizer at least partially overlaps with the display image import device in a direction perpendicular to the display image import device, and the first polarizer is configured to convert the light of the first image in the display image export device to be the first linear polarized light; and the second polarizer is provided at the opposite side, the second polarizer at least partially overlaps with the light intensity detection device in the direction perpendicular to the display image import device, and the second polarizer is configured to convert the light of the surrounding image in the display image export device to be the second linear polarized light.

For example, the display system provided by at least one embodiment of the present disclosure further comprises a polarization beam combiner. The polarization beam combiner at least partially overlaps with the light intensity detection device in the direction perpendicular to the display image import device; and the polarization beam combiner is configured to transmit at least part of the second linear polarized light and to reflect at least part of the first linear polarized light.

For example, in the display system provided by at least one embodiment of the present disclosure, a position of the light transmission control device is one of following positions: the position that is at the opposite side of the display image export device and at least partially overlaps with the light intensity detection device in a direction perpendicular to the display image import device; and the position that is at a display side of the display image import device, and at least partially overlaps with a light-incident surface of the display image import device in a direction perpendicular to the display image import device.

For example, in the display system provided by at least one embodiment of the present disclosure, the light transmission control device comprises: an electrical transmittance adjustment element made of a polymer dispersed liquid crystal material, or an electrical polarized light generation element and the electrical polarized light generation element is configured to be in a polarized light generating state or a polarized light non-generating state.

For example, in the display system provided by at least one embodiment of the present disclosure, the light intensity control device further comprises a computing device; and the computing device is configured to obtain image contrast matching information between the surrounding image and the first image based on the intensity of the light of the surrounding image which is obtained by the light intensity detection device and the intensity of the light of the first image which is obtained by the light intensity detection device.

For example, in the display system provided by at least one embodiment of the present disclosure, the light intensity detection device is configured to obtain an average value of the intensity of the light of the surrounding image and an average value of the intensity of the light of the first image;

and the computing device is configured to obtain the image contrast matching information based on the average value of the intensity of the light of the surrounding image and the average value of the intensity of the light of the first image.

For example, in the display system provided by at least one embodiment of the present disclosure, the light intensity detection device is configured to obtain the surrounding image and the first image, so as to obtain the intensity of the light of the surrounding image and the intensity of the light of the first image at pixels of the light intensity detection device where the light of the surrounding image and the light of the first image are incident; and the computing device is configured to obtain the image contrast matching information based on the intensity of the light of the surrounding image and the intensity of the light of the first image which are obtained by at least part of the pixels.

For example, in the display system provided by at least one embodiment of the present disclosure, the light intensity control device further comprises a controller. The controller is configured, based on the image contrast matching information, to control the intensity of the light of the first image outputted to the display image import device.

For example, in the display system provided by at least one embodiment of the present disclosure, the light intensity control device further comprises a light intensity adjustment device; the light intensity adjustment device is provided at the opposite side of the display image export device; and the controller is further configured to control light transmittance of the light intensity adjustment device based on the image contrast matching information.

For example, the display system provided by at least one embodiment of the present disclosure further comprises one or more lenses. The one or more lenses are configured to transmit the first image, and allow the light of the first image to be outputted into the display image import device.

For example, the display system provided by at least one embodiment of the present disclosure further comprises a display element. The one or more lenses are configured to collimate the light of the first image outputted by the display element into parallel light, and then transmit the light of the first image into the display image import device.

For example, in the display system provided by at least one embodiment of the present disclosure, the display image import device and the display image export device are combined with each other, or integrally formed, so as to obtain an optical waveguide body; the display image import device comprises a reflective surface; and the display image export device comprises one half-transparent and half-reflective surface or a plurality of half-transparent and half-reflective surfaces arranged in parallel.

At least one embodiment of the present disclosure further provides an image display method, and the display method comprises: receiving light of a first image and transmitting the light of the first image to a display image export device; and controlling at least one of an intensity of light of a surrounding image and an intensity of the light of the first image. The display image export device comprises a display side and an opposite side which is opposite to the display side; the first image is displayed at the display side; and at least part of the display image export device is configured to be at least partially transparent, so as to, at the display side of the display image export device, receive at least part of a surrounding image for the opposite side at the display side of the display image export device.

For example, the image display method provided by at least one embodiment of the present disclosure further comprises: collecting the light of the surrounding image and the light of the first image at the display side, so as to obtain the intensity of the light of the surrounding image and the intensity of the light of the first image; and controlling the intensity of the light of the surrounding image and/or the intensity of the light of the first image based on the intensity of the light of the surrounding image which is collected and the intensity of the light of the first image which is collected.

For example, in the image display method provided by at least one embodiment of the present disclosure, image contrast matching information between the surrounding image and the first image is obtained based on the intensity of the light of the surrounding image which is collected and the intensity of the light of the first image which is collected; and the intensity of the light of the surrounding image which is outputted at the display side and/or the intensity of the light of the first image which is outputted at the display side are controlled based on the image contrast matching information.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms 'first,' 'second,' etc., which are used in the description and the claims of the present application for disclosure, are not intended to indicate any sequence, amount or importance, but distinguish various components. Also, the terms such as 'a,' 'an,' etc., are not intended to limit the amount, but indicate the existence of at least one. The terms 'comprise,' 'comprising,' 'include,' 'including,' etc., are intended to specify that the elements or the objects stated before these terms encompass the elements or the objects and equivalents thereof listed after these terms, but do not preclude the other elements or objects. The phrases 'connect', 'connected', etc., are not intended to define a physical connection or mechanical connection, but may include an electrical connection, directly or indirectly. 'On,' 'under,' 'right,' 'left' and the like are only used to indicate relative position relationship, and when the position of the object which is described is changed, the relative position relationship may be changed accordingly.

Figure 1:
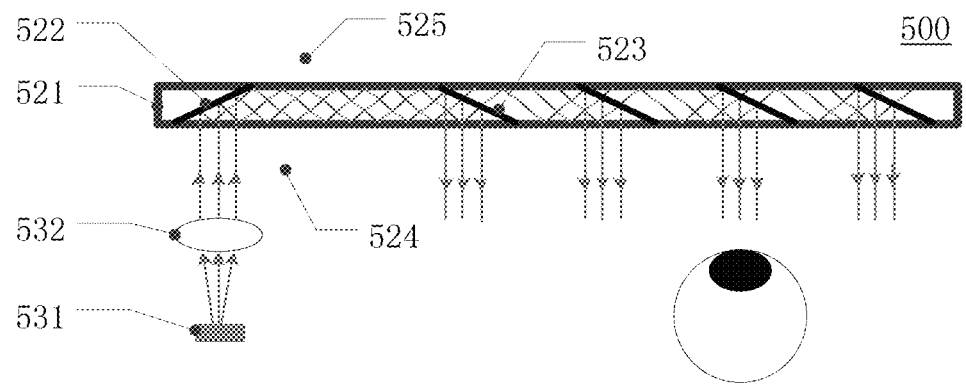
FIG. 1 is a display system based on an optical waveguide.

For example, FIG. 1 is a display system 500 based on an optical waveguide, as illustrated in FIG. 1, the display system 500 based on the optical waveguide includes an optical waveguide body 521, one or more lenses 532 and a micro-display 531. For example, the optical waveguide body 521 includes a reflective surface 522 and one or more (for example, four) half-transparent and half-reflective surfaces 523, the four half-transparent and half-reflective surfaces 523 are combined with each other to realize display function, and to form a display device (an optical waveguide based display device). The display device includes a display side 524 and an opposite side 525 which is opposite to the display side 524.

For example, the light of the image outputted by the micro-display 531 is incident onto the reflective surface 522 of the optical waveguide body 521 after transmitted through one or more lenses 532, and the reflective surface 522 of the optical waveguide body 521 is configured to allow an incident angle of at least part of the light of the image incident onto the reflective surface 522 to satisfy the total reflection condition of the optical waveguide body 521, so as to allow the light of the image to be able to be propagated in the optical waveguide body 521 from the left end to the right end of the optical waveguide body 521, and therefore, the optical waveguide body 521 is not required to be straight or flat in this case. During the process that the light of the image is propagated to the right end of the optical waveguide body 521 from the left end of the optical waveguide body 521, the light of the image is sequentially incident onto the four half-transparent and half-reflective surface 523. Part of the light of the image incident onto each half-transparent and half-reflective surface 523 is reflected by the half-transparent and half-reflective surface 523, so as to allow the propagation angle of the part of the light of the image to be changed by the half-transparent and half-reflective surface 523, and thus the part of the light of the image does not satisfy the total reflection condition of the optical waveguide body 521 anymore, and then is outputted to the display side 524 of the optical waveguide body 521. Furthermore, at least part of the light forming the surrounding image for the outside scene at the opposite side 525 of the optical waveguide body 521 can pass through the optical waveguide body 521, and be outputted to the display side 524 of the optical waveguide body 521. Therefore, the user at the display side 524 of the optical waveguide body 521 can observe the surrounding image for the outside scene and the virtual image generated by the micro-display 531, and in this way the display system 500 can realize an augmented reality display function.

The inventor has noted that, in the above-mentioned display system 500 based on the optical waveguide, mismatch between the intensity of the light of a display image and the intensity of the light of the surrounding image for the outside scene may be present. For example, under outdoor sunny daylight, the intensity of the light of the surrounding image for the outside scene can be significantly greater than the intensity of the light of the display image. For another example, under outdoor low light at night, the intensity of the light of the display image can be significantly greater than the intensity of the light of the surrounding image for the outside scene, that is, the contrast mismatch between the display image and the surrounding image for the outside scene may be present, and therefore, the effect of fusion of a display image and an outside scene can be poor and the user experience can be poor.

Embodiments of the present disclosure provides a display system and an image display method, and the contrast ratio between the display image and the outside scene image can be optimized through obtaining the intensity of the light of the surrounding image and the intensity of the light of the first image.

At least one embodiment of the present disclosure provides a display system, and the display system includes a display image export device, a display image import device and a light intensity control device. The display image export device includes a display side and an opposite side which is opposite to the display side; at least part of the display image export device is configured to be at least partially transparent, so as to be able to receive at least part of a surrounding image for the opposite side at the display side of the display image export device; and the display image export device is further configured to display a first image at the display side. The display image import device is configured to receive light of the first image, and to transmit the light of the first image to the display image export device. The light intensity control device is configured to control at least one of an intensity of light of the surrounding image and an intensity of the light of the first image.

At least one embodiment of the present disclosure further provides an image display method, and the display method includes: receiving light of a first image, and transmitting the light of the first image to a display image export device; and controlling at least one of an intensity of light of a surrounding image and an intensity of the light of the first image. The display image export device includes a display side and an opposite side which is opposite to the display side; the first image is displayed at the display side; and at least part of the display image export device is configured to be at least partially transparent, so as to be able to receive at least part of a surrounding image for the opposite side at the display side of the display image export device.

For example, the light intensity control device includes a light intensity detection device and a light transmission control device. The light intensity detection device is provided at the display side of the display image export device, and is configured to be able to collect the light of the surrounding image and the light of the first image. The light transmission control device is configured to control the intensity (or intensities) of the light of the surrounding image and/or the light of the first image, which are incident onto the light intensity detection device at different time, so as to allow the light intensity detection device to be able to obtain the intensity of the light of the surrounding image and the intensity of the light of the first image.

In different embodiments, for example, the light transmission control device may include a first polarizer and a first polarization control element, and the first polarizer is configured to convert the light of the first image or the light of the surrounding image in the display image export device to be first linear polarized light; the first polarization control element is provided between the display image export device and the light intensity detection device, and the first polarization control element is configured to be able to pass through the first linear polarized light and block the second linear polarized light, so as to allow the first linear polarized light to be incident onto the light intensity detection device, or the first polarization control element is configured to be able to pass through the second linear polarized light and block the first linear polarized light, so as to allow the second linear polarized light to be incident onto the light intensity detection device; the polarization direction of the second linear polarized light is perpendicular to the polarization direction of the first linear polarized light. For another example, the light transmission control device may also be provided at the opposite side of the display image export device and at least partially overlaps with the light intensity detection device in the direction perpendicular to the display image import device, or the light transmission control device may also be provided at the display side of the display image import device and at least partially overlaps with the input end of the display image import device in the direction perpendicular to the display image import device, and the light transmission control device is configured to control the intensities of the light of the surrounding image or the light of the first image which are incident onto the light intensity detection device at different time.

Non-limitive descriptions are given to the embodiments and the examples of the embodiments of the present disclosure in the following. As described in the following, in case of no conflict, different features in these specific embodiments may be combined so as to obtain new embodiments, and the new embodiments are also fall within the scope of the present disclosure.

First Embodiment

The present embodiment provides a display system 100, and the display system 100 can be implemented as a monocular type augmented reality glasses. For example, the display system 100 can correspond to the left eye of a user; for another example, the display system 100 can also correspond to the right eye of the user.

Figure 2A:
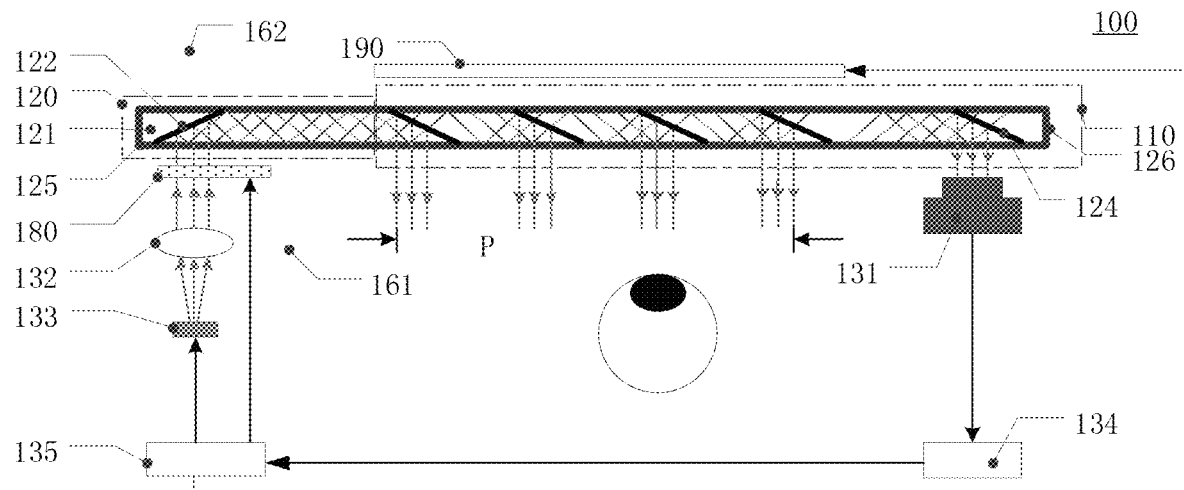
FIG. 2A is a cross-sectional view of a display system provided by a first embodiment.

For example, FIG. 2A is a cross-sectional view of the display system 100 provided by the first embodiment. For example, as illustrated in FIG. 2A, the display system 100 may include a display image export device 110, a display image import device 120 and a light intensity control device, and the light intensity control device includes a light intensity detection device 131 and a light transmission control device 180.

For example, the light transmission control device 180 may include a light intensity control element. By arranging the light intensity control element, the light intensity detection device 131 can obtain the intensity of the light of the surrounding image which is outputted to the display side of the display image export device 110, and the sum of the intensities of the light of the first image and the light of the surrounding image which are outputted to the display side of the display image export device 110 at different time, and therefore, the display system 100 can obtain the intensity of the light of the first image, and can optimize the contrast ratio between the first image and the surrounding image based on the obtained intensity of the light of the first image and the obtained intensity of the light of the surrounding image.

In the following, the display system 100 provided by the first embodiment will be described in detail with reference to FIG. 2A to FIG. 5B.

For example, as illustrated in FIG. 2A, the display image export device 110 may be an optical waveguide type display device, and the display image export device 110 and the display image import device 120 may be combined with each other after being separately formed, or alternatively, can be integrally formed (in this case, there is no interface between the display image export device 110 and the display image import device 120). For example, as illustrated in FIG. 2A, in the case where the display image import device 120 and the display image export device 110 are combined with each other or integrally formed, the integral structure thus obtained is an optical waveguide body 121, the display image export device 110 may include a middle region and a right region of the optical waveguide body 121. For example, the display image export device 110 may include a display side 161 and an opposite side 162 which is opposite to the display side 161, and at least part of the display image export device 110 is configured to be at least partially transparent, such that at least part of the surrounding image (i.e., an image generated by environment light, and this image can be referred to as an outside scene image as well) from the opposite side 162 can be received at the display side 161 of the display image export device 110. For example, at least part of the light (for example, visible light) of the surrounding image for the scene at the opposite side 162 can pass through the display image export device 110, such that the user can observe the surrounding image for the scene of the opposite side 162 at the display side 161.

For example, as illustrated in FIG. 2A, the display image import device 120 may be configured to receive the light of the first image (may also be referred to as the display image). For example, the first image may be outputted by a display element 133, and may be outputted into the display image import device 120 after being transmitted through one or more lenses 132, such that the first image can be observed by the user. For example, the display element 133 and one or more lenses 132 may be a component of the display system 100 or can be additionally equipped by the user. For the sake of clarity, details regarding the first image, the display element 133, and one or more lenses 132 will be described after the contents regarding the display image import device 120, the light intensity detection device 131, and the light transmission control device 180 and so on are described.

For example, the display image import device 120 is configured to be capable of transmitting the light of the first image to the display image export device 110, such that the display image export device 110 can display the first image at the display side. For example, the optical waveguide body 121 may include a first end 125 (for example, the left end of the optical waveguide body 121 as illustrated in FIG. 2A) and the second end 126 (for example, the right end of the optical waveguide body 121 as illustrated in FIG. 2A). For example, when the light of the first image received by the display image import device 120 is coupled into the display image import device 120, the propagation angle of at least part of the light of the first image may satisfy the total reflection condition of the display image import device 120 and the optical waveguide body 121, such that the at least part of the light of the first image can propagate from one end (for example, the first end 125) of the optical waveguide body 121 to another end (for example, the second end 126) of the optical waveguide body 121. Therefore, the light of the first image can transmit to the display image export device 110, and the display image export device 110 can display the first image at the display side 161.

For example, the concrete structure of the display image import device 120 may be set according to specific implementation demands, and no limitations will be given to the embodiment of the present disclosure in this respect. For example, as illustrated in FIG. 2A, the display image import device 120 may include a reflective surface 122, the display image export device 110 may include a half-transparent and half-reflective surface 124, and the reflective surface 122 and the half-transparent and half-reflective surfaces 124 may be provided in the optical waveguide body 121.

Figure 2B:
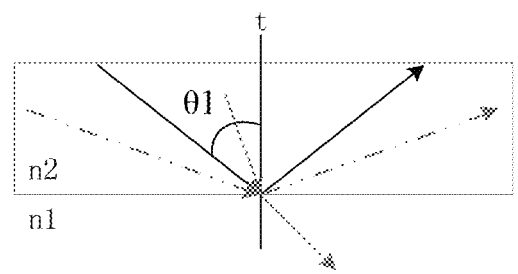
FIG. 2B is a schematic diagram illustrating a total reflection condition of an optical waveguide body.

For example, FIG. 2B is a schematic diagram illustrating the total reflection condition of the optical waveguide body 121. For example, in the case where the refractive index of the material of the optical waveguide body 121 is n2, the refractive index of the material of the medium (for example, air) outside the optical waveguide body 121 is n1, when the propagation angle of the light in the optical waveguide body 121 (i.e., the angle θ1 between the light in the optical waveguide body 121 and the normal direction t of the display surface of the optical waveguide body 121) is greater than arcsin (n1/n2) (i.e., the critical angle of total reflection for the optical waveguide body 121), the light satisfies the total reflection condition of the optical waveguide body 121. For example, the critical angle of total reflection for the optical waveguide body 121 is decreased along with an increase of the refractive index n2 of the material of the optical waveguide body 121, that is, the greater the refractive index n2 of the material of the optical waveguide body 121 is, the easier it is for the light to satisfy the total reflection condition of the optical waveguide body 121.

For example, the material of the optical waveguide body 121 may be chosen according to specific implementation demands, and no limitations will be given to the embodiment of the present disclosure in this respect. For example, the light loss caused by the material of the optical waveguide body 121 for visible light may be small (for example, the loss for visible light may be smaller than 0.2 dB/cm), such that the brightness of display images and the energy efficiency of the display system 100 can be improved. For example, the optical waveguide body 121 may be made of a material with a large refractive index, such that the critical angle of total reflection for the optical waveguide body 121 can be decreased and the design flexibility of the display system 100 can be increased. For example, the refractive index n2 of the material for fabricating the optical waveguide body 121 can be 1.5-1.6; for example, the optical waveguide body 121 can adopt quartz glass or fluoride glass, but the embodiment of the present disclosure are not limited to these cases.

For example, the reflective surface 122 may be configured to allow the propagation angle of the light of the first image (for example, at least part of the light of the first image) to satisfy the total reflection condition of the optical waveguide body 121. For example, the reflective surface 122 may be a multilayer dielectric film, but the embodiment of the present disclosure is not limited to this case. For example, the reflective surface 122 may have a high reflectivity for visible light (for example, the reflectivity for visible light is larger than 99.9%).

For example, the light of the first image incident onto the reflective surface 122 may be reflected by the reflective surface 122 so as to change the propagation direction (or the angle) and to be imported into the optical waveguide body 121. For example, in the case where the propagation angle of the light, which is in the optical waveguide body 121, of the first image satisfies the total reflection condition of the optical waveguide body 121, the light of the first image can be propagated in the optical waveguide body 121.

For example, the setting angle of the reflective surface 122 may be determined according to specific implementation demands, and no limitations will be given to the embodiment of the present disclosure in this respect. For example, the angle between the reflective surface 122 and the surface (for example, the surface illustrated in FIG. 5A) of the display image import device 120 may be set to be 25 degrees, 30 degrees, 25 degrees and so on, but the embodiment of the present disclosure is not limited to these cases; the angle between the reflective surface 122 and the surface of the display image import device 120 may be set to be other angles, as long as the reflective surface 122 allows the propagation angle of the light, which is reflected by the reflective surface 122, of the first image (for example, at least part of light of the first image) to satisfy the total reflection condition of the display image import device 120.

For example, in order to render the display system 100 to be more compact, the reflective surface 122 can be set in an end of the optical waveguide body 121 (for example, an edge of the reflective surface 122 is in direct contact with the optical waveguide body 121), but the embodiment of the present disclosure is not limited to this case. For example, the setting position of the reflective surface 122 may correspond to the setting position of the display element 133 (for example, the reflective surface 122 and the display element 133 are at least partially overlapped with each other in the direction perpendicular to the optical waveguide body 121).

For example, the reflective surface 122 needs to be capable of receiving the light of the first image outputted by the display element 133.

For example, the half-transparent and half-reflective surface 124 of the display image export device 110 may be configured to export part of the light, which is incident onto the half-transparent and half-reflective surface 124, of the first image to the display side 161 of the display image export device 110 through reflection, and the half-transparent and half-reflective surface 124 is further configured to allow part of the light, which is incident onto the half-transparent and half-reflective surface 124, of the surrounding image to be outputted to the display side 161 of the display image export device 110 by the way of light transmission. For example, the outgoing angle of the light, which is outputted to the display side 161 and illustrated in FIG. 2A, of the first image is only an example, and the embodiment of the present disclosure is not limited to this case. For example, the display image export device 110 may include one half-transparent and half-reflective surface 124 or a plurality of half-transparent and half-reflective surfaces 124 arranged in parallel. For example, the number, reflectivity, and settings of the half-transparent and half-reflective surfaces 124 included by the display image export device 110 may be set according to specific implementation demands, and no limitations will be given to the embodiment of the present disclosure in these respects.

For example, the display image export device 110 may include two half-transparent and half-reflective surfaces 124. For example, one half-transparent and half-reflective surface 124 may be provided in the middle region of the optical waveguide body 121 (for example, the center of the optical waveguide body 121), and can be used for exporting the light of the first image to the eye(s) of a user at the display side; the other half-transparent and half-reflective surfaces 124 may be provided, for example, in the second end 126 of the optical waveguide body 121, and can be used for exporting the light of the first image to the light collecting surface of the light intensity detection device 131 at the display side.

For another example, the display image export device 110 may also include five half-transparent and half-reflective surfaces 124. For example, four half-transparent and half-reflective surfaces 124 may be provided in the middle region of the optical waveguide body 121 (for example, the four half-transparent and half-reflective surfaces 124 may be arranged symmetrically with respect to the symmetric axis along the length direction of the optical waveguide body 121), and can be used for exporting the light of the first image to the eye(s) of a user at the display side; one half-transparent and half-reflective surfaces 124 may be provided, for example, in the second end 126 of the optical waveguide body 121, and can be used for exporting the light of the first image to the light collecting surface of the light intensity detection device 131 arranged at the display side. For example, in the case where the middle region of the optical waveguide body 121 is arranged with a plurality of half-transparent and half-reflective surfaces 124, the exit pupil (that is, the diameter P of the outputted beam as illustrated in FIG. 2A) of the display system 100 can be increased, and thus the user experience can be improved.

For example, the reflectivity values of the plurality of half-transparent and half-reflective surfaces 124 can be increased sequentially, and the reflectivity of the half-transparent and half-reflective surface 124 closer to the second end 126 is larger than the reflectivity of the half-transparent and half-reflective surface 124 closer to the first end 125, such that the homogeneity of the intensity of the light outputted by the display system 100 can be increased. For example, as illustrated in FIG. 2A, in the case where the display image export device 110 includes five half-transparent and half-reflective surfaces 124, the reflectivity values of the half-transparent and half-reflective surfaces 124 arranged in parallel from the first end 125 to the second end 126 can be sequentially set to be 13%, 14.9%, 17.6%, 21.3% and 27.1%, but the embodiment of the present disclosure is not limited to this case.

For example, for the sake of clarity, a specific design example of the optical waveguide body 121 and the half-transparent and half-reflective surfaces 124 will be described after the contents regarding the light transmission control device 180 and the light intensity detection device 131 and so on are described.

For example, the light transmission control device 180 may be provided at the display side 161 of the display image export device 110, and the light transmission control device 180 may be opposite to the reflective surface of the display image import device 120 (for example, the light transmission control device 180 at least partially overlaps with the reflective surface 122 of the display image import device 120 in the direction perpendicular to the display image import device). For example, the light transmission control device 180 may be configured to control the intensity of the light of the first image which is incident onto the light intensity detection device 131 at different time. For example, as illustrated in FIG. 2A, the light transmission control device 180 may be provided between the light-incident surface of the display image import device 120 and the one or more lenses 132, but the embodiment of the present disclosure is not limited to this case. For another example, the light transmission control device 180 also may be provided between the display element 133 and the one or more lenses 132.

For example, the light transmission control device 180 may include a light intensity control element. For example, specific arrangement of the light intensity control element may be set according to actual implementations, and no limitations will be given in the embodiment of the present disclosure in this respect. For example, the light intensity control element may include an electrical transmittance adjustment element, and the electrical transmittance adjustment element is configured to be able to in a light-transmitting state or a light-blocking state. For example, the electrical transmittance adjustment element may include a polymer dispersed liquid crystal (PDLC) material or an electrochromic material, and the PDLC material and the electrochromic material can present the light-transmitting state and the light-blocking state according to the voltage applied onto the PDLC material and the electrochromic material.

For example, an exemplary arrangement of the light intensity control element will be described in detail in the following with reference to FIG. 3A and FIG. 3B.

Figure 3A:
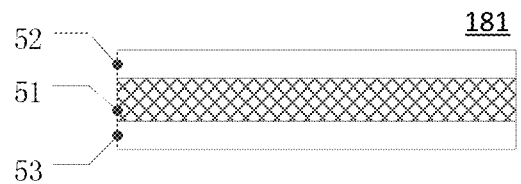
FIG. 3A is an exemplary arrangement of a light intensity control element.

For example, FIG. 3A is an exemplary arrangement of the light intensity control element 181. For example, the light transmission control device 180 as illustrated in FIG. 2A may be implemented into the light intensity control element 181 as illustrated in FIG. 3B, but the embodiment of the present disclosure is not limited to this case.

For example, the light intensity control element 181 may include a first conductive layer 52, a second conductive layer 53 and a polymer dispersed liquid crystal layer 51. The first conductive layer 52 and the second conductive layer 53, for example, may be transparent conductive layers. For example, in the case where a voltage is applied onto the first conductive layer 52 and the second conductive layer 53, the electric field between the first conductive layer 52 and the second conductive layer 53 can change the property of the PDLC material, and therefore, the light intensity control element 181 can be in the light-transmitting state; in this case, the first image outputted by the display element 133 can pass through the light intensity control element 181 and into the display image import device 120. In the case where no voltage is applied onto the first conductive layer 52 and the second conductive layer 53, an adverse change is present in the PDLC material of the polymer dispersed liquid crystal layer 51, and therefore, the light intensity control element 181 can be in the light-blocking state; in this case, the first image outputted by the display element 133 cannot be inputted into the display image import device 120 because of the light-blocking of the light intensity control element 181. For example, the transmittance (for example, the transmittance for visible light) of the light intensity control element 181 in the light-transmitting state and in the light-blocking state may be respectively TC1 and TC2. For example, the specific values of TC1 and TC2 may be set according to specific implementations. TC1, for example, may be greater than 99.9%, and TC2, for example, may be smaller than 0.1%. For example, for the sake of clarity, for the light intensity control element 181, TC1 and TC2 are respectively assumed to be 100% and 0%, but the embodiment of the present disclosure is not limited to this case.

For example, specific control methods of the light intensity control element 181 may be set according to specific implementation demands, and no limitations will be given to the embodiment of the present disclosure in this respect.

For example, the light intensity control element 181 may be allowed to be alternately in the light-transmitting state and in the light-blocking state. For example, FIG. 3B is an exemplary driving timing diagram of the light intensity control element 181 as illustrated in FIG. 3A. For example, the light intensity control element 181 as illustrated in FIG. 3A may be driven by the driving timing diagram as illustrated in FIG. 3B. Firstly, no voltage is applied onto the polymer dispersed liquid crystal layer 51 of the light intensity control element 181, so as to allow the light intensity control element 181 is in the light-transmitting state; in this case, the light intensity detection device 131 can obtain the sum $I_d+I_h$ of the intensity $I_d$ of the light of the first image which are outputted to the display side 161 of the display image export device 110 and the intensity $I_h$ of the light of the surrounding image which are outputted to the display side 161 of the display image export device 110 (for example, the region, which is corresponding to the light intensity detection device 131, of the display image export device 110). Later, a voltage E is applied onto the polymer dispersed liquid crystal layer 51 of the light intensity control element 181, so as to allow the light intensity control element 181 to be in the light-blocking state, and the light of the first image cannot be inputted into the display image import device 120 because of the light blocking of the light intensity control element 181. Therefore, the intensity $I_h$ of the light of the surrounding image which is outputted at the display side 161 of the display image export device 110 can be obtained by the light intensity detection device 131; and thus the display system 100 can obtain the intensity $I_d$ of the light of the first image outputted at the display side 161 of the region, which is corresponding to the light intensity detection device 131, of the display image export device 110 by calculation.

For example, in the embodiments of the present disclosure, the intensity $I_d$ of the light of the first image and the intensity $I_h$ of the light of the surrounding image are not represent specific values, and are only intended for illustrating the method for the light intensity detection device 131 to obtain the intensity of the light of the first image and the intensity of the light of the surrounding image.

For example, because the transmittance and the reflectivity values of the half-transparent and half-reflective surfaces 124 is known or may be obtained through measurement, the intensities of the light of the first image and the light of the surrounding image outputted at the display side of the region, which is corresponding to the eye of a user, of the display image export device 110 can be obtained based on the intensity $I_d$ of the light of the first image and the intensity $I_h$ of the light of the surrounding image outputted at the display side of the region, which is corresponding to the light intensity detection device 131, of the display image export device 110, and therefore, the image contrast matching information between the first image and the surrounding image can be obtained based on the above-mentioned information.

For example, by allowing the light intensity control element 181 to be alternately in the light-transmitting state and in the light-blocking state, the image contrast matching information between the first image and the surrounding image can be obtained in real time, such that the contrast ratio between the first image and the surrounding image can always be in good condition. For example, the time t1 for the light intensity control element 181 to be in the light-transmitting state and the time t2 for the light intensity control element 181 to be in the light-blocking state may be set according to specific implementation demands, and no limitations will be given to the embodiment of the present disclosure in this respect. For example, in order to improve display effect, the time t2 for the light intensity control element 181 to be in the light-blocking state may adopt a minimum value provided that the measurement accuracy can be guaranteed, and t2, for example, may set to be 0.5 seconds or 0.1 seconds, but the embodiment of the present disclosure is not limited to these cases. For example, the time t1 for the light intensity control element 181 to be in the light-transmitting state may be set to be a constant value, for example, may be set to be 5 minutes. For another example, the time t1 for the light intensity control element 181 to be in the light-transmitting state may be set to be different values automatically according to the work mode set by the user. For example, in the case where a stationary mode is set by the user (in this case, the intensity of the light changes slowly), the time t1, for example, may set to be 30 minutes; in the case where a movement mode is set by the user (in this case, the intensity of the light changes quickly), the time t1, for example, may set to be 1 minute. Therefore, the power consumption of the display system 100 can be reduced while the matching degree of the contrast ratio between the first image and the surrounding image is guaranteed.

Figure 3B:
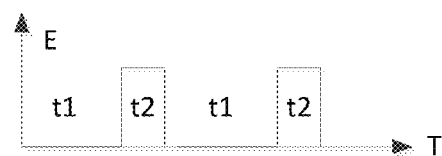
FIG. 3B is an exemplary driving timing diagram of the light intensity control element as illustrated in FIG. 3A.

For example, the specific driving method for the light intensity control element 181 as illustrated in FIG. 3A is not limited to the driving timing diagram as illustrated in FIG. 3B. For example, the light intensity control element 181 may be in the light-blocking state only when the user observes the mismatch of the contrast ratio between the first image and the surrounding image (for example, the light intensity control element 181 may be in the light-blocking state for a pre-determined time period after the user sends a command for adjusting the contrast ratio), such that the intensity $I_h$ of the light of the surrounding image can be obtained, and therefore, the intensity $I_d$ of the light of the first image can be obtained based on the sum $I_d+I_h$ of the intensity $I_d$ of the light of the first image and the intensity $I_h$ of the light of the surrounding image, in which the sum $I_d+I_h$ is obtained while the light intensity control element 181 is in the light-transmitting state. For example, the time for the light intensity control element 181 to be in the light-blocking state may be set according to specific implementations, and no limitations will be given here in this respect. For example, the power consumption for the display system 100 can be further reduced by allowing the light intensity control element 181 to be in the light-blocking state for a pre-determined time period only when the user observes the mismatch of the contrast ratio between the first image and the surrounding image.

For example, an exemplary arrangement for the light intensity detection device 131 will be described in detail in the following with reference to FIG. 2A.

For example, as illustrated in FIG. 2A, the light intensity detection device 131 may be provided at the display side 161 of the display image export device 110. For example, the light-collecting surface of the light intensity detection device 131 may face toward the opposite side 162 of the display image export device 110. For example, the types and specific settings of the light intensity detection device 131 may be set according to specific implementation demands, and no limitations will be given to the embodiment of the present disclosure in these respects.

For example, the light intensity detection device 131 may be a power meter or an energy meter, in this case, the light intensity detection device 131 can obtain the average value of the intensity of the light (for example, the average value of the intensity of the light of the surrounding image). For another example, the light intensity detection device 131 may also be an imaging type light intensity detection device, and the imaging type light intensity detection device, for example, may be a CCD type or a CMOS type camera; in this case, the light intensity detection device 131 is configured to be able to obtain the image which is incident onto the light intensity detection device 131, and therefore, the light intensity detection device 131 can obtain the intensities of the light of the surrounding image and the light of the first image, which are incident onto pixels of the light intensity detection device 131.

For example, the light intensity detection device 131 may be maintained in the working state, but the embodiment of the present disclosure is not limited to this case. For example, the light intensity detection device 131 may be in the working state during part of the time that the light intensity control element 181 is in the light-blocking state and the light-transmitting state. For example, the light intensity detection device 131 may be in the working state once when the light intensity control element 181 is in the light-blocking state and in the working state once when the light intensity control element 181 is in the light-transmitting state, so as to collect the intensity of the light, which is outputted at the display side of the display image export device 110, when the light intensity control element 181 is in the light-blocking state and collect the intensity of the light, which is outputted at the display side of the display image export device 110, when the light intensity control element 181 is in the light-transmitting state. For example, a time synchronizer may be adopted to allow the light intensity control element 181 and the light intensity detection device 131 to be in a synchronous state, that is, to allow the light intensity detection device 131 to collect the intensity of the light incident onto the light intensity detection device 131 at least once when the light intensity control element 181 is in the light-blocking state and to allow the light intensity detection device 131 to collect the intensity of the light incident onto the light intensity detection device 131 at least once when the light intensity control element 181 is in the light-transmitting state. For example, the time for the light intensity detection device 131 to collect the intensity of the light may set to be 0.5 seconds, but the embodiment of the present disclosure is not limited to this case.

For example, the position of the light intensity detection device 131 with respect to the length direction (that is, the horizontal direction in FIG. 2A) and the width direction (that is, the direction which is perpendicular to the paper surface in FIG. 2A) of the optical waveguide body 121 may be set according to specific implementation demands, and no limitations will be given to the embodiment of the present disclosure in these respects, as long as the light intensity detection device 131 can obtain the surrounding image and the intensity of the light of the first image.

For example, in order to allow the display system 100 to be more compact, the light-collecting surface of the light intensity detection device 131 may be located at the display side 161 and be opposite to an end (for example, the second end 126) of the optical waveguide body 121. For example, the light-collecting surface of the light intensity detection device 131 may be located at the display side 161 and be opposite to the half-transparent and half-reflective surfaces 124 closer to the second end 126 (for example, the rightmost half-transparent and half-reflective surfaces 124 in FIG. 2A). For example, according to specific implementation demands, the position of the light intensity detection device 131 with respect to the width direction of the optical waveguide body 121 may be the position close to the upper region of the second end 126 of the optical waveguide body 121, but the embodiment of the present disclosure is not limited to this case. For example, according to the angle of the light, which is outputted at the display side 161, of the display image export device 110, the light-collecting surface of the light intensity detection device 131 may be set to be parallel to or not to be parallel to the display surface of the display image export device 110, and no limitations will be given in the embodiment of the present disclosure in this respect.

For example, the light-collecting surface of the light intensity detection device 131 may be immediate contacts with the surface, which is located in the display side 161, of the display image export device 110, such that stray light cannot be incident onto the light-collecting surface of the light intensity detection device 131, and therefore, the accuracy of the obtained information regarding the intensity of the light can be improved.

For another example, the light-collecting surface of the light intensity detection device 131 may be spaced apart from the display surface, which is at the opposite side 162, of the display image export device 110 for a pre-determined distance, and an optical system (not shown in FIG. 2A) may be provided between the light-collecting surface of the light intensity detection device 131 and the display surface, which is at the opposite side 162, of the display image export device 110, such that a light intensity detection device with a small light-collecting surface may be adopted to obtain a complete first image and a complete surrounding image, and more information regarding the first image and the surrounding image can be obtained. Therefore the weight and the cost of the light intensity detection device 131 can be reduced while the matching degree of the contrast ratio between the first image and the surrounding image is guaranteed.

For example, the display system 100 (the light intensity control device of the display system 100) may further include a computing device 134, specific arrangement of the computing device 134 will be described in detail in the following with reference to FIG. 2A.

For example, as illustrated in FIG. 2A, the signal connection between the computing device 134 and the light intensity detection device 131 may be realized through electrical connection, and the computing device 134 may be configured to obtain the image contrast matching information between the surrounding image and the first image based on the intensities of the light of the surrounding image and the first image, which are collected by the light intensity detection device 131.

For example, the computing device 134 may be implemented through a software, a hardware, a firmware or any combination of them, and may be realized based on the following descriptions, but details of implementation methods (for example, software programming, FPGA programming, or the like) will not be given here. For example, the computing device 134 may be connected with related components of the display system 100 (for example, the light intensity detection device 131) through a wired or wireless manner. For another example, the computing device 134 may also be equipped by the user according to implementation demands. For example, the functions of the computing device 134 may be realized by an existing mobile electronic product (for example, cellphone) of the user.

For example, in the case where the light intensity detection device 131 is a power meter or an energy meter, the computing device 134 may obtain the image contrast matching information based on the average value of the intensity of the light of the surrounding image and the average value of the intensity of the light of the first image, in this case, the obtained image contrast matching information may be an overall image contrast matching information.

For example, in the case where the light intensity detection device 131 is a CCD type or CMOS type camera or video cam, the light intensity detection device 131 may obtain the surrounding image and the first image respectively, such that the intensities of the light of the surrounding image and the light of the first image, which are incident onto pixels of the light intensity detection device 131, can be obtained; in this case, the computing device 134 may obtain the image contrast matching information based on the intensities of the light of the surrounding image and the light of the first image which are corresponding to at least part of the pixels. The obtained image contrast matching information may be a local image contrast matching information and/or an overall image contrast matching information.

For example, in the case where the light intensity detection device 131 is a CCD type or CMOS type camera or video cam, the method for the computing device 134 to obtain the image contrast matching information based on the intensities of the light of the surrounding image and the light of the first image corresponding to at least part of the pixels may be set according to specific implementation demands, and no limitations will be given to the embodiment of the present disclosure in this respect.

For example, the computing device 134 may obtain the local image contrast matching information between the first image and the surrounding image through the following method. Firstly, the computing device 134 can obtain the light intensity value of the pixel with the highest brightness in the first image and the light intensity value of the pixel with the highest brightness in the surrounding image and/or obtain the light intensity value of the pixel with the lowest brightness in the first image and the light intensity value of the pixel with the lowest brightness in the surrounding image. And then the computing device 134 may obtain the image contrast matching information based on the ratio or the difference between the light intensity value of the pixel with the highest brightness in the first image and the light intensity value of the pixel with the highest brightness in the surrounding image (and/or the ratio or the difference between the light intensity value of the pixel with the lowest brightness in the first image and the light intensity value of the pixel with the lowest brightness in the surrounding image).

For another example, the computing device 134 may also obtain the local image contrast matching information between the first image and the surrounding image through the following method. Firstly, the computing device 134 may obtain the average value of the light intensity of the high brightness region of the first image and the average value of the light intensity of the high brightness region of the surrounding image and/or obtain the average value of the light intensity of the low brightness region of the first image and the average value of the light intensity of the low brightness region of the surrounding image. And then, the computing device 134 may obtain the local image contrast matching information based on the ratio or the difference between the average value of the light intensity of the high brightness region of the first image and the average value of the light intensity of the high brightness region of the surrounding image (and/or the ratio or the difference between the average value of the light intensity of the low brightness region of the first image and the average value of the light intensity of the low brightness region of the surrounding image).

For example, in the case where the light intensity detection device 131 is a CCD type or CMOS type camera or video cam, the computing device 134 may also obtain the overall image contrast matching information between the first image and the surround ding image. For example, firstly, the computing device 134 may obtain the average value of the light intensity of the first image and the average value of the light intensity of the surrounding image; and then, the computing device 134 may obtain the overall image contrast matching information based on the ratio or the difference between the average value of the light intensity of the first image and the average value of the light intensity of the surrounding image.

For example, the image contrast matching information may be information indicating whether or not the intensity of the light of the first image and the intensity of the light of the surrounding image are matched. For example, '1' or '0' may be adopted to respectively represent that the light intensity between the first image and the surrounding image is matched or not matched, but the embodiment of the present disclosure is not limited to this case. For example, in the case where the ratio between the light intensity of the pixel with the highest brightness in the first image and the light intensity of the pixel with the highest brightness in the surrounding image is greater than 2 or smaller than $\frac{1}{2}$, or in the case where the ratio between the average value of the light intensity of the high brightness region in the first image and the average value of the light intensity of the high brightness region in the surrounding image is greater than 2 or smaller than $\frac{1}{2}$, or in the case where the average value of the light intensity of the entire first image and the average value of the light intensity of the entire surrounding image is greater than 2 or smaller than ½, the computing device 134 may determine that the light intensity of the first image and the light intensity of the surrounding image are not matched. For another example, the image contrast matching information may also be a value indicating the matching degree between the intensity of the light of the first image and the intensity of the light of the surrounding image. For example, according to specific implementation demands, the absolute value of the difference between the intensity of the light of the first image (for example, the light intensity of the pixel with the highest brightness or the average value of the light intensity the high brightness region or the average value of the overall light intensity) and the intensity of the light of the surrounding image may be adopted to represent the matching degree of the intensity of the light of the first image and the intensity of the light of the surrounding image; in this case, the matching degree of the intensity of the light of the first image and the intensity of the light of the surrounding image is decreased with an increase of the absolute value, and the matching degree of the intensity of the light of the first image and the intensity of the light of the surrounding image is increased with an decrease of the absolute value.

For example, the display system 100 (the light intensity control device of the display system 100) may further include a controller 135, and specific arrangements of the controller 135 will be described in detail in the following with reference to FIG. 2A.

For example, as illustrated in FIG. 2A, the signal connection between the controller 135 and the computing device 134 and the signal connection between the controller 135 and the display element 133 may be realized through electrical connection and so on, and the controller 135 may be configured to adjust the intensity of the light of the first image outputted by the display element 133 based on the image contrast matching information, which is obtained by the computing device 134, between the surrounding image and the first image, such that the intensity of the light of the first image outputted to the display image import device 120 can be controlled.

For example, the controller 135 may be implemented through a software, a hardware, a firmware or any combination of them, and may be realized based on the following descriptions, but details of implementation methods (for example, software programming, FPGA programming, or the like) will not be given here. For example, the controller 135 may be connected with related components of the display system 100 (for example, the display element 133) through a wired or wireless manner. For another example, the controller 135 may also be equipped by the user according to implementation demands. For example, the functions of the controller 135 may be realized by an existing mobile electronic product (for example, cellphone) of the user. Alternatively, the controller 135 and the computing device 134 may be realized by the same hardware. For example, the controller 135 and the computing device 134 may be formed in same one chip. For another example, the controller 135 and the computing device 134 may be realized by same one processor and memory, and computer programs that can be executed to realize control and calculation functions are stored on the memory.

For example, the controller 135 may be configured to control the intensity of the light of the first image outputted to the display image import device 120 based on the image contrast matching information. For example, in the case where the user uses the display system 100 with outdoor sunny daylight, when the user walks from indoor to outdoor, the intensity of the light of the surrounding image may be increased, and this can cause the mismatch of the image contrast between the surrounding image and the first image; in this case, the controller 135 may increase the intensity of the light of the first image outputted to the display image import device 120, so as to optimize the image contrast between the surrounding image and the first image. For another example, in the case where the user uses the display system 100 at outdoor evening, the intensity of the light of the surrounding image may be decreased gradually, and this can cause the mismatch of the image contrast between the surrounding image and the first image; in this case, the controller 135 may decrease (for example, gradually decrease) the intensity of the light of the first image outputted to the display image import device 120, so as to optimize the image contrast between the surrounding image and the first image. For example, in the case where the image contrast matching information includes the overall image contrast matching information, the intensity of the light of the first image outputted to the display image import device 120 may be increased/decreased as a whole. For another example, in the case where the image contrast matching information includes the local image contrast matching information, according to specific implementation demands, the light intensity of an partially region of the first image may be increased/decreased provided that the contrast ratio of the first image is guaranteed.

For example, the display system 100 (the light intensity control device of the display system 100) may further include a light intensity adjustment device 190, and the light intensity adjustment device 190 will be described in detail in the following with reference to FIG. 2A and FIG. 4.

For example, as illustrated in FIG. 2A, the light intensity adjustment device 190 may be provided at the opposite side 162 of the display image export device 110. For example, the light intensity adjustment device 190 may be only provided at the region, which is corresponding to human eye, of the display image export device 110 (for example, may only overlap the region, which is corresponding to human eye, of the display image export device 110), such that the weight and the cost of the display system 100 may be reduced. For another example, according to specific implementation demands, the light intensity adjustment device 190 may also overlap the entire display image export device 110 or the entire optical waveguide body 121, and no limitations will be given in the embodiment of the present disclosure in this respect.

For example, the light intensity adjustment device 190 may be spaced apart from the display image export device 110 and the display image import device 120 for a predetermined space (for example, 0.5 mm); in this case, the total reflection condition of the display image export device 110 and the display image import device 120 at the display side is consistent with the total reflection condition of the display image export device 110 and the display image import device 120 at the opposite side, and therefore, the design of the display system 100 can be simplified. For example, opaque spacer or adhesive and so on may be provided at the periphery of the light intensity adjustment device 190, such that the environmental light cannot be incident onto the display image export device 110 from the side surface of the display system 100, and thus cannot exit the display image export device 110 to the display side of the display image export device 110.

For example, the light intensity adjustment device 190 may change the transmittance of the light intensity adjustment device 190 according to specific implementation demands (for example, based on the image contrast matching information). For example, specific arrangement and control method of the light intensity adjustment device 190 may be set according to specific implementation demands, and no limitations will be given to the embodiment of the present disclosure in these respects.

Figure 4:
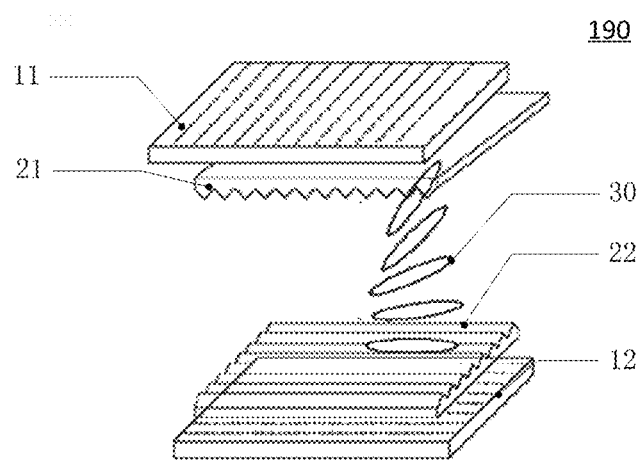
FIG. 4 is an exemplary arrangement of a light intensity adjustment device.

For example, FIG. 4 is an exemplary arrangement of the light intensity adjustment device 190. For example, the light intensity adjustment device 190 may include a liquid crystal valve, and the liquid crystal valve, for example, may be a TN (twisted nematic) mode liquid crystal valve. FIG. 4 illustrates a schematic diagram of a TN mode liquid crystal valve structure. As illustrated in FIG. 4, the liquid crystal valve may include an upper polarizer 11, an upper substrate 21, a liquid crystal layer 30, a lower substrate 22, a lower polarizer 12 (the polarization direction of lower polarizer 12 is perpendicular to the polarization direction of the upper polarizer 11), a first conductive layer (not shown in FIG. 4) provided between the upper substrate 21 and the liquid crystal layer 30, and a second conductive layer (not shown in FIG. 4) provided between the liquid crystal layer 30 and the lower substrate 22. For example, the light emitted by an external light source may be incident onto the lower polarizer 12, and the light, which is emitted by the external light source and has same one polarization direction with the lower polarizer 12 may pass through the lower polarizer 12 and be incident onto the liquid crystal layer 30. In the case where different voltages are applied onto the liquid crystal layer 30 via the first conductive layer 52 and the second conductive layer 53, the liquid crystal layer 30 can allow the polarized light, which is pass through the liquid crystal layer 30 to rotate different angles, such that the intensity of the light, which exits from the upper polarizer 11, can be changed by changing the voltage applied onto the liquid crystal layer 30.

For example, the light intensity adjustment device 190 as illustrated in FIG. 4 may change the transmittance of the light intensity adjustment device 190 based on the image contrast matching information, such that the intensity of the light of the surrounding image which is outputted at the display side of the display image export device 110 can be adjusted. For example, the light intensity adjustment device 190 may include one liquid crystal valve; in this case, the light intensity adjustment device 190 may adjust the overall light intensity of the surrounding image outputted at the display side of the display image export device 110. For another example, the light intensity adjustment device 190 may also include a plurality of liquid crystal valves which are arrayed, such that the light intensity adjustment device 190 may adjust the light intensity of a partially region and an entire region of the surrounding image which is outputted at the display side of the display image export device 110.

For example, as illustrated in FIG. 2A, the controller 135 may be electrically connected with the light intensity adjustment device 190, and may be configured to control the transmittance of the light intensity adjustment device 190 based on the image contrast matching information. For example, regarding the method for optimizing the image contrast between the surrounding image and the first image through controlling the transmittance of the light intensity adjustment device 190 by the controller 135, exemplary descriptions will be provided in the following with reference to FIG. 2A.

For example, in the case where the user uses the display system 100 with outdoor sunny daylight, when the user walks from indoor to outdoor, the intensity of the light of the surrounding image may be increased, and this can cause the mismatch of the image contrast between the surrounding image and the first image; in this case, the controller 135 may also be adopted to decrease the transmittance of the light intensity adjustment device 190, so as to decrease the intensity of the light of the surrounding image which is outputted at the display side of the display image export device 110, and therefore, the image contrast between the surrounding image and the first image can be optimized. For example, in the case where the display element 133 cannot further increases the intensity of the light of the first image or in the case where the intensity of the light of the first image is, for example, about to exceed the human eye safety threshold, the transmittance of the light intensity adjustment device 190 may be decreased to optimize the image contrast between the surrounding image and the first image.

For another example, in the case where the user uses the display system 100 at outdoor evening, the intensity of the light of the surrounding image may be decreased gradually, and this can cause the mismatch of the image contrast between the surrounding image and the first image; in this case, the controller 135 may increase (for example, gradually increase) the transmittance of the light intensity adjustment device 190, so as to increase the intensity of the light of the surrounding image which is outputted at the display side of the display image export device 110, and therefore, the image contrast between the surrounding image and the first image can be optimized. For example, in the case where the intensity of the light of the first image outputted by the display element 133 is relatively low, the image contrast between the surrounding image and the first image can be optimized through increasing the transmittance of the light intensity adjustment device 190, in this case, the intensity of the light of the first image may be increased along with an increase of the transmittance of the light intensity adjustment device 190, so as to avoid the brightness of the image (for example, the first image), which is observed by an human eye, being too low.

For example, in the case where the image contrast matching information is the overall image contrast matching information, the overall transmittance of the light intensity adjustment device 190 may be increased/decreased as a whole, such that the overall light intensity of the surrounding image which is outputted at the display side of the display image export device 110 may be adjusted. For another example, in the case where the image contrast matching information is the local image contrast matching information, according to specific implementation demands, the transmittance of partially region of the light intensity adjustment device 190 may be increased/decreased provided that the contrast ratio of the surrounding image is guaranteed, such that the light intensity of the partially region of the surrounding image which is outputted at the display side of the display image export device 110 may be adjusted.

For example, specific arrangements of the display element 133 and one or more lenses 132 will be described in detail in the following with reference to FIG. 2A.

For example, the type, the position and the arrangements of the display element 133 may be set according to specific implementation demands, and no limitations will be given to the embodiment of the present disclosure in these respects. For example, the display element 133 may be a micro-display (for example, an organic light-emitting diode display device, a silicon based micro-display or a liquid crystal display device, and so on). For example, as illustrated in FIG. 2A, the display element 133 may be a component of the display system 100. For example, according to specific implementation demands, the display element 133 may be provided at the display side 161 or the opposite side 162 of the display image export device 110, and no limitations will be given in the embodiment of the present disclosure in this respect. For example, in order to allow the display system 100 to be more compact, the display element 133 may be opposite to an end of the display image import device 120 (for example, the first end of the optical waveguide body 121), but the embodiment of the present disclosure is not limited to this case. For another example, in order to satisfy customized demands and lower the cost of the display system 100, the display element 133 may also be equipped by the user when required. For example, in order to improve the display effect, a pre-determined position of the display system 100 may be provided with an assembly structure (for example, an assembly slot) used for assembling the display element 133 by the user. For example, the above-mentioned assembly slot may be provided at the display side 161 or the opposite side 162 of the display image export device 110.

For example, the display system 100 may further include one or more lenses 132, and one or more lenses 132 may be configured to pass through the first image and allow the light of the first image to be outputted to the display image import device 120. For example, one or more lenses 132 may be configured to collimate the light of the first image outputted by the display element 133 into parallel light, and then configured to output the light of the first image into the display image import device 120. For example, the parallel light collimated by one or more lenses 132 may be perpendicularly incident onto the light-incident surface of the display image import device 120. For another example, the parallel light collimated by one or more lenses 132 may also be incident onto the light-incident surface of the display image import device 120 with a pre-determined angle, the incident angle of the parallel light may be set according to specific implementations, as long as the propagation angle of the parallel light which is reflected by the reflective surface 122 satisfies the total reflection condition of the optical waveguide body 121, and no limitations will be given in the embodiment of the present disclosure in this respect. For example, one or more lenses 132 may further be configured to collimate the light of the first image outputted by the display element 133 into a plurality groups (for example, three groups) of parallel light, and then configured to output the light of the first image into the display image import device 120. For example, the lens 132 and the display element 133 may be two separate components. For another example, the lens 132 and the display element 133 may also be integrated into one component, and no limitations will be given in the embodiment of the present disclosure in this respect. For example, the controller 135 may be an independent component of the display system 100, and the controller 135 may also be integrated into one component with one or more lenses 132 and the display element 133, and no limitations will be given in the embodiment of the present disclosure in this respect.

Figure 5A:
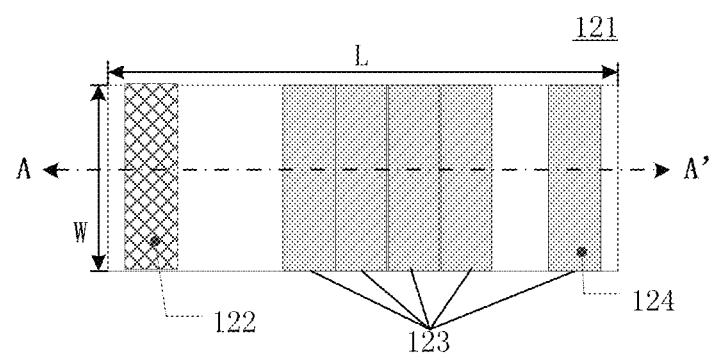
FIG. 5A is a plan view of an optical waveguide body provided by the first embodiment.
Figure 5B:
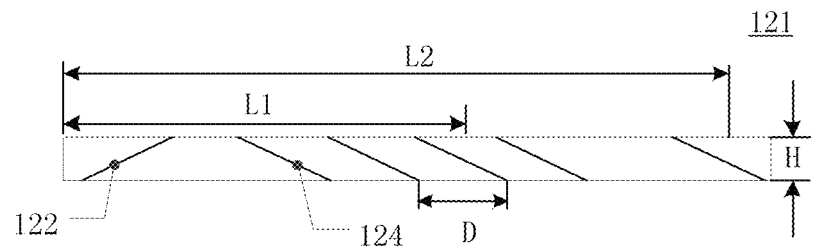
FIG. 5B is a cross-sectional view of the optical waveguide body as illustrated in FIG. 5A, obtained along line A-A'.

For example, an exemplary arrangement of the optical waveguide body 121 will be described in detail in the following with reference to FIG. 5A and FIG. 5B. For example, FIG. 5A and FIG. 5B are respectively a plan view and a cross-sectional view of the optical waveguide body 121 provided by the first embodiment, the cross-sectional view as illustrated in FIG. 5B is sectioning along the Line A-A' as illustrated in FIG. 5A. For example, in the case where the optical waveguide body 121 includes the reflective surface and a plurality of half-transparent and half-reflective surfaces 124, the structure parameters of the optical waveguide body 121 may be set according to the following example, but the embodiment of the present disclosure is not limited to this case.

For example, as illustrated in FIG. 5A and FIG. 5B, the values of the length L, the width W and the thickness H of the optical waveguide body 121 may respectively set to be 50 mm, 28 mm and 2.5 mm. For example, in order to allow the user to view a seamless image, no gap exists between the orthographic projections of the plurality of the half-transparent and half-reflective surfaces 124 on the display surface of the optical waveguide body 121 (that is, adjacent edges of the orthographic projections of adjacent half-transparent and half-reflective surfaces 124 on the display surface of the optical waveguide body 121 are abut with each other). For example, as illustrated in FIG. 5A, the right border of the orthographic projection of the left most half-transparent and half-reflective surfaces 124 on the display surface of the optical waveguide body 121 (i.e., the display surface of the display image export device 110) immediately abut the left border of the orthographic projection of the second half-transparent and half-reflective surfaces 124 from left to right on the display surface of the optical waveguide body 121, such that the user experience can be improved. For example, the angle between the half-transparent and half-reflective surface and the display surface of the optical waveguide body 121 may be set to be 25 degrees. For example, the widths D of the orthographic projections of the half-transparent and half-reflective surfaces 124 on the display surface of the optical waveguide body 121 may be set to be 5.36 mm. For example, the symmetric axis in the length direction of the orthographic projection of the third half-transparent and half-reflective surface 124 from left to right on the display surface of the optical waveguide body 121 may coincide with the symmetric axis in the length direction of the optical waveguide body 121, that is, the distance L1 between the first end 125 and the symmetric axis in the length direction of the orthographic projection of the third half-transparent and half-reflective surface 124 from left to right on the display surface of the optical waveguide body 121 may be set to be 25 mm. For example, the distance L2 between the first end 125 and the symmetric axis in the length direction of the orthographic projection of the fifth half-transparent and half-reflective surface 124 from left to right on the display surface of the optical waveguide body 121 may be set to be 47 mm.

For example, in the present embodiment, the light intensity control element is used as the light transmission control device, and the light intensity detection device may obtain the intensity of the light of the surrounding image which is outputted at the display side of the display image export device, and the sum of the intensities of the light of the first image and the light of the surrounding image, which are outputted at the display side of the display image export device at different time, and therefore the display system can obtain the intensity of the light of the first image, and can optimize the contrast ratio between the first image and the surrounding image based on the obtained intensity of the light of the first image and the obtained intensity of the light of the surrounding image, and thus the intensity (intensities) of the light of the surrounding image and/or the light of the first image, which are outputted at the display side of the display image export device can be controlled based on the image contrast matching information, and the image contrast between the surrounding image and the first image can be optimized.

Second Embodiment

The present embodiment provides a display system 100, the display system 100 is similar to the embodiment as illustrated in FIG. 2A (i.e., the first embodiment), and the difference is that the light transmission control device 180 is implemented as a second polarization control element (for example, the second polarization control element 182 as illustrated in FIG. 6A-FIG. 6D) instead of being implemented as the light intensity control element. For example, for the sake of clarity, the present embodiment only describes the difference with respect to the first embodiment, and no further description will be given to the content similar to the first embodiment.

For example, the second polarization control element may include an electrical polarized light generation element, and the electrical polarized light generation element may be configured to be in a polarized light generating state or in a polarized light non-generating state. For example, specific arrangements of the second polarization control element may be set according to specific implementation demands, and no limitations will be given to the embodiment of the present disclosure in this respect.

Figure 6A:
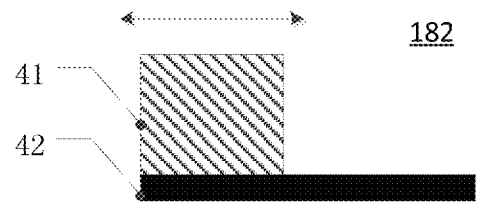
FIG. 6A is an exemplary side view of a second polarization control element.
Figure 6B:
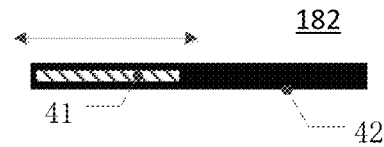
FIG. 6B is an exemplary top view of the second polarization control element as illustrated in FIG. 6A.

For example, FIG. 6A and FIG. 6B illustrates an exemplary arrangement of the second polarization control element 182. For example, FIG. 6A and FIG. 6B are respectively a side view and a top view of the second polarization control element 182. For example, as illustrated in FIG. 6A, the second polarization control element 182 may include a polarized light generating device 41 (for example, a linear polarizer), and the polarized light generating device 41, for example, may be provided on a moving mechanism 42 (for example, an electric guide rail). For example, the polarized light generating device 41 may convert natural light into linear polarized light; in this case, the ratio between the intensity of the outputted linear polarized light and the intensity of the natural light which is incident onto the polarized light generating device 41 can be obtained through measurement, and it is usually considered that the intensity of the outputted linear polarized light is half of the intensity of the natural light which is incident onto the polarized light generating device 41. For example, for the sake of clarity, in the present embodiment, the intensity of the outputted linear polarized light is assumed to be half of the intensity of the natural light which is incident onto the polarized light generating device 41, but the embodiment of the present disclosure is not limited to this case.

Figure 6C:
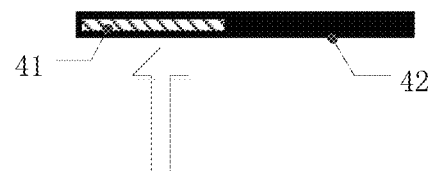
FIG. 6C is a schematic diagram of the second polarization control element, which is in a polarized light generating state, as illustrated in FIG. 6A.
Figure 6D:
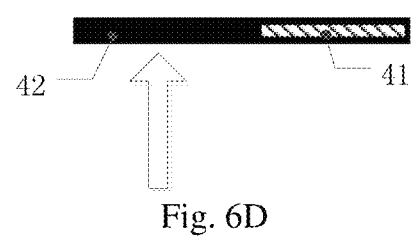
FIG. 6D is a schematic diagram of the second polarization control element, which is in a polarized light non-generating state, as illustrated in FIG. 6A.

For example, the polarized light generating device 41 may move along the guide rail according to specific implementation demands. For example, as illustrated in FIG. 6C, in the case where the electrical polarized light generation element is need to be in the polarized light generating state, the moving mechanism 42 may allow the polarized light generating device 41 to be in the position that the polarized light generating device 41 intersects the light of the first image (for example, the position as illustrated in FIG. 6C). In this case, the polarized light generating device 41 can allow the intensity of the light of the first image to be, for example, reduced by half. For another example, as illustrated in FIG. 6D, in the case where the electrical polarized light generation element is need to be in a polarized light non-generating state, the moving mechanism 42 may allow the polarized light generating device 41 to be in the position that the polarized light generating device 41 does not intersect the light of the first image (for example, the position as illustrated in FIG. 6D), in this case, the intensity of the light of the first image remains unchanged after pass through the electrical polarized light generation element.

For example, the method for the display system 100 provided by the present embodiment to obtain the intensity of the light of the first image $I_d$ and the intensity of the light of the surrounding image $I_h$ will be described in detail in the following with reference to FIG. 2A.

For example, as illustrated in FIG. 2A, in the case where the electrical polarized light generation element is in the polarized light generating state, the light intensity $I_1$ obtained by the light intensity detection device 131 is the sum of half of the intensity $I_d/2$ of the light of the first image and the intensity $I_h$ of the light of the surrounding image, that is, $I_1 = I_d/2 + I_h$; in the case where the electrical polarized light generation element is in the polarized light non-generating state, the light intensity $I_2$ obtained by the light intensity detection device 131 is the sum of the intensity $I_d$ of the light of the first image and the intensity $I_h$ of the light of the surrounding image, that is, $I_2 = I_d + I_h$. Therefore, the intensity $I_d$ ($I_d = 2I_2 - 2I_1$) of the light of the first image and the intensity $I_h$ ($I_h = 2I_1 - I_2$) of the light of the surrounding image can be obtain based on the light intensity $I_1$ and the light intensity $I_2$, which are collected by the light intensity detection device 131.

For example, because the transmittance and the reflectivity of the half-transparent and half-reflective surfaces 124 are known or may be measured, the intensities of the light of the first image and the light of the surrounding image outputted at the display side of the region, which is corresponding to an eye of an user, of the display image export device 110 may be obtained based on the intensity $I_d$ of the light of the first image outputted at the display side of the region, which is corresponding to the light intensity detection device 131, of the display image export device 110 and the intensity $I_h$ of the light of the surrounding image outputted at the display side of the region, which is corresponding to the light intensity detection device 131, of the display image export device 110, and therefore, the image contrast matching information between the first image and the surrounding image may be obtained based on the above-mentioned information (for example, may be obtained by the computing device 134).

For example, the controller 135 may be configured to adjust the intensity of the light of the first image outputted by the display element 133 based on the image contrast matching information, which is obtained by the computing device 134, between the surrounding image and the first image, and thus the intensity of the light of the first image outputted to the display image import device 120 can be controlled. Therefore, the contrast ratio between the first image and the surrounding image can be optimized. For example, in the case where the display system 100 further includes the light intensity adjustment device 190, the intensity of the light of the surrounding image which is outputted at the display side of the display image export device 110 may also be adjusted by controlling the transmittance of the light intensity adjustment device 190.

For example, in the present embodiment, by providing the electrical polarized light generation element, the light intensity detection device may obtain the sum of half of the intensity of the light of the first image which is outputted at the display side of the display image export device and the intensity of the light of the surrounding image which is outputted at the display side of the display image export device, and the sum of the intensity of the light of the first image which is outputted at the display side of the display image export device and the intensity of the light of the surrounding image which is outputted at the display side of the display image export device at different time, and therefore, the display system can obtain the intensity of the light of the first image and the intensity of the light of the surrounding image, and thus can optimize the contrast ratio between the first image and the surrounding image based on the obtained intensity of the light of the first image and the obtained intensity of the light of the surrounding image. For example, by providing the electrical polarized light generation element, the user can still view the first image while the electrical polarized light generation element is in the polarized light generating state, and therefore, the user experience can be improved.

Third Embodiment

The present embodiment provides a display system 100, the display system 100 is similar to the embodiment as illustrated in FIG. 2A (i.e., the first embodiment), and the difference is that the light transmission control device 180 is provided at the opposite side 162 of the display image export device 110 and is opposite to the light intensity detection device 131 (the light transmission control device 180 at least partially overlaps with the light intensity detection device 131 in the direction perpendicular to the display image import device and), and the light transmission control device 180 is not provided at the display side 161 of the display image import device 120 and opposite to the light-incident surface of the display image import device 120. For example, for the sake of clarity, the present embodiment only describes the difference with respect to the embodiment as illustrated in FIG. 2A, and no further description will be given to the content similar to the embodiment as illustrated in FIG. 2A.

Figure 7:
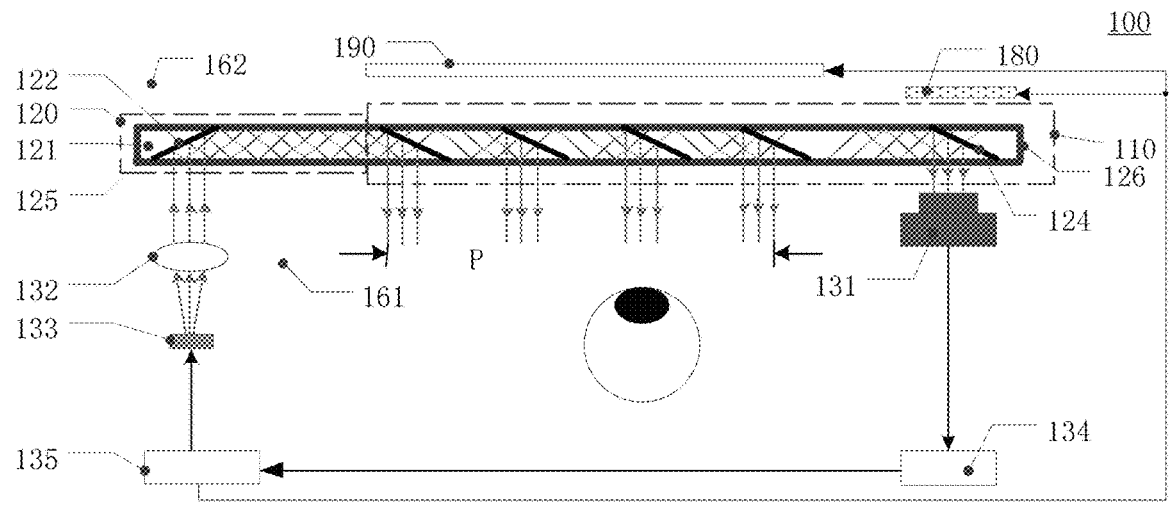
FIG. 7 is a cross-sectional view of a display system provided by a third embodiment and a fourth embodiment.

For example, the light transmission control device 180 as illustrated in FIG. 7 may adopt the light intensity control element as illustrated in FIG. 3A. For example, in the case where the display system 100 further includes the light intensity adjustment device 190, the light intensity control element and the light intensity adjustment device 190 may be two separate components. For another example, in the case where the light intensity adjustment device 190 can adjust the transmittance partially, the function of the light intensity control element may also be realized by the region, which is corresponding to the light intensity detection device 131, of the light intensity adjustment device 190. For example, as illustrated in FIG. 7, in the case where the light intensity control element is in the light-transmitting state, the light intensity $I_1$ obtained by the light intensity detection device 131 is the sum of the intensity $I_d$ of the light of the first image and the intensity $I_h$ of the light of the surrounding image, that is, $I_1=I_d+I_h$. In the case where the light intensity control element is in the light-blocking state, the light intensity $I_2$ obtained by the light intensity detection device 131 is the intensity $I_d$ of the light of the first image, that is, $I_2=I_d$. Therefore, the intensity $I_d$ ($I_d=I_2$) of the light of the first image and the intensity $I_h$ ($I_h=I_1-I_2$) of the light of the surrounding image may be obtained based on the light intensity $I_1$ and the light intensity $I_2$ which are collected by the light intensity detection device 131.

For example, the image contrast matching information between the first image and the surrounding image may be obtained (for example, may be obtained by the computing device 134) based on the above-mentioned information, and the intensity (intensities) of the light of the surrounding image and/or the light of the first image outputted at the display side of the region, which is corresponding to an eye of an user, of the display image export device 110 may be controlled (for example, may be controlled through controlling the intensity of the light of the first image outputted by the display element 133 and/or the transmittance of the light intensity adjustment device 190) based on the above-mentioned image contrast matching information. Therefore, the contrast ratio, which is viewed by the human eye, between the first image and the surrounding image can be optimized.

For example, in the present embodiment, by providing the light intensity control element at the opposite side of the display image export device, the light intensity detection device may obtain the sum of the intensity of the light of the first image and the intensity of the light of the surrounding image outputted at the display side of the display image export device, and the intensity of the light of the first image at different time. Therefore, the display system can obtain the intensity of the light of the first image and the intensity of the light of the surrounding image, and thus can optimize the contrast ratio between the first image and the surrounding image based on the obtained intensity of the light of the first image and the obtained intensity of the light of the surrounding image. For example, by allowing the light intensity control element to be provided at the opposite side of the display image export device, and allowing the light intensity control element and the light intensity detection device to be opposite to each other, the user can still view the first image while the light intensity control element is in the light-blocking state, and therefore, the user experience can be improved.

Fourth Embodiment

The present embodiment provides a display system 100, the display system 100 is similar to the embodiment as illustrated in FIG. 7, (i.e., the third embodiment), and the difference is that the light transmission control device 180 is implemented as the second polarization control element 182 instead of being implemented as the light intensity control element, that is, the display system provided by the present embodiment may adopt the display system as illustrated in FIG. 7, and use the second polarization control element 182 as the light transmission control device 180. For example, for the sake of clarity, For example, for the sake of clarity, the present embodiment only describes the difference with respect to the third embodiment, and no further description will be given to the content similar to the third embodiment.

For example, the second polarization control element 182 may include an electrical polarized light generation element, and the second polarization control element 182, for example, may adopt the electrical polarized light generation element as illustrated in FIG. 6A-FIG. 6D.

For example, as illustrated in FIG. 7, in the case where the electrical polarized light generation element is in the polarized light generating state, the light intensity $I_1$ obtained by the light intensity detection device 131 is the sum of half of the intensity $I_h/2$ of the light of the surrounding image and the intensity $I_d$ of the light of the first image, that is, $I_1=I_d+I_h/2$. In the case where the electrical polarized light generation element is in the polarized light non-generating state, the light intensity $I_2$ obtained by the light intensity detection device 131 is the sum of the intensity $I_d$ of the light of the first image and the intensity $I_h$ of the light of the surrounding image, that is, $I_2=I_d+I_h$. Therefore, the intensity $I_h$ ($I_h=2I_2-2I_1$) of the light of the surrounding image and the intensity $I_d$ ($I_d=2I_1-I_2$) of the light of the first image may be obtained based on the light intensity $I_1$ and the light intensity $I_2$ which are collected by the light intensity detection device 131.

For example, the image contrast matching information between the first image and the surrounding image may be obtained (for example, may be obtained by the computing device 134) based on the above-mentioned information, and the intensity (intensities) of the light of the surrounding image and/or the light of the first image outputted at the display side of the region, which is corresponding to an eye of an user, of the display image export device 110 may be controlled based on the above-mentioned image contrast matching information. Therefore, the contrast ratio, which is viewed by the human eye, between the first image and the surrounding image can be optimized.

For example, in the present embodiment, by providing the electrical polarized light generation element at the opposite side of the display image export device, the light intensity detection device may obtain the sum of half of the intensity of the light of the surrounding image which is outputted at the display side of the display image export device and the intensity of the light of the first image which is outputted at the display side of the display image export device, and the sum of the intensity of the light of the surrounding image and the intensity of the light of the first image at different time, and therefore, the display system can obtain the intensity of the light of the first image and the intensity of the light of the surrounding image, and thus the contrast ratio between the first image and the surrounding image can be optimized based on the obtained intensity of the light of the first image and the obtained intensity of the light of the surrounding image. For example, by providing the electrical polarized light generation element at the opposite side of the display image export device, the user can still view the first image while the electrical polarized light generation element is in the polarized light generating state, and therefore, the user experience can be improved.

Fifth Embodiment

The present embodiment provides a display system 100, the display system 100 is similar to the embodiment as illustrated in FIG. 2A (i.e., the first embodiment), and the difference is that the function of the light transmission control device is realized by a first polarization control element 173 and a polarizer. For example, for the sake of clarity, the present embodiment only describes the difference with respect to the first embodiment, and no further description will be given to the content similar to the first embodiment.

Figure 8:
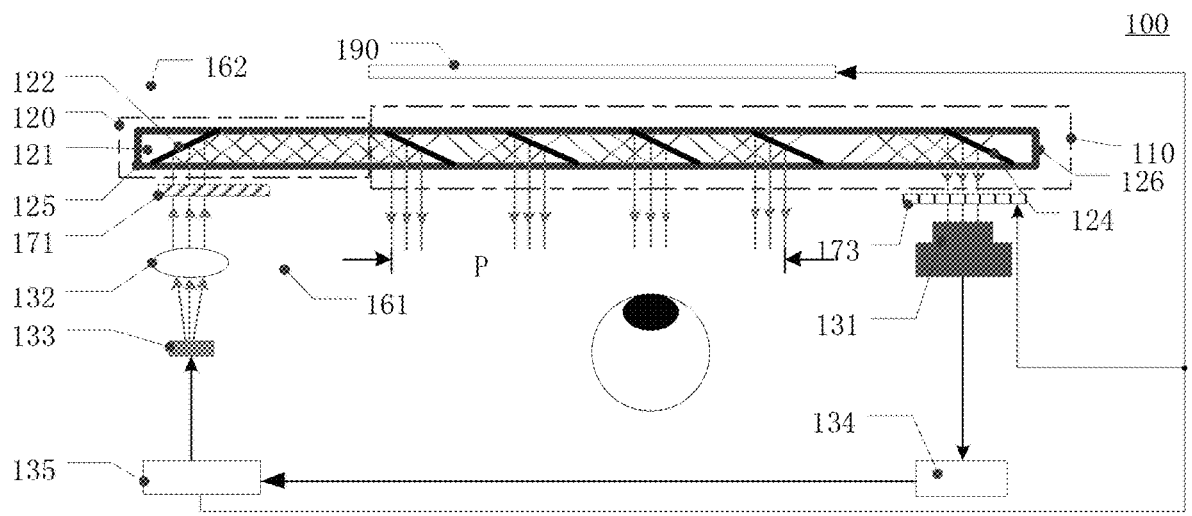
FIG. 8 is a cross-sectional view of a display system provided by a fifth embodiment.

For example, FIG. 8 is a cross-sectional view of the display system 100 provided by the fifth embodiment. For example, as illustrated in FIG. 9, the light transmission control device may include a first polarizer 171 and the first polarization control element 173. For example, the first polarizer 171 may be provided at the display side 161 of the display image export device 110 and be opposite to the light-incident surface of the display image import device 120 (the surface of the region, which is corresponding to the reflective surface, of the display image import device 120). The specific position of the first polarizer 171 may be set according to specific implementation demands, and no limitations will be given to the embodiment of the present disclosure in this respect. For example, the first polarizer 171 may be provided between the light-incident surface of the display image import device 120 and one or more lenses 132. For another example, the first polarizer 171 may also be provided between the display element 133 and one or more lenses 132.

For example, the natural light may be considered as two linear polarized light which are perpendicular to each other, and therefore, after the natural light is incident onto the polarizer, the linear polarized light, which has same one polarization direction with the polarizer, of the natural light may pass through the linear polarizer, and the linear polarized light, the polarization direction of which is perpendicular with the polarization direction of the polarizer, of the natural light cannot pass through the linear polarizer because of the blocking of the polarizer.

For example, the first polarizer 171 may convert the light of the first image which is incident onto the first polarizer 171 into the linear polarized light, and therefore, the first polarizer 171 can allow the light of the first image in the display image export device 110 to be first linear polarized light (for example, the s-polarized light). For example, in the case where the light of the first image outputted by the display element 133 is the natural light, the intensity of the first linear polarized light outputted from the first polarizer 171 may be considered as equal to half of the intensity of the natural light outputted by the display element 133.

For example, the first polarization control element 173 may be provided between the display image export device 110 and the light intensity detection device 131, and the first polarization control element 173 may be configured to be able to pass through the first linear polarized light and block the second linear polarized light, so as to allow the first linear polarized light to be incident onto the light intensity detection device 131, or the first polarization control element 173 may be configured to be able to pass through the second linear polarized light and block the first linear polarized light, so as to allow the second linear polarized light to be incident onto the light intensity detection device 131. For example, the polarization direction of the second linear polarized light is perpendicular to the polarization direction of the first linear polarized light. For example, in the case where the first linear polarized light is the s-polarized light, the second linear polarized light may be the p-polarized light.

For example, at a first time T1, the first polarization control element 173 may pass through the first linear polarized light and block the second linear polarized light, so as to allow the first linear polarized light to be incident onto the light intensity detection device 131. In this case, the first polarization control element 173 is in a first state. At a second time T2, the first polarization control element 173 may pass through the second linear polarized light and block the first linear polarized light, so as to allow the second linear polarized light to be incident onto the light intensity detection device. In this case, the first polarization control element 173 is in the second state.

For example, the specific arrangement and the driving method of the first polarization control element 173 may be set according to specific implementation demands, and no limitations will be given to the embodiment of the present disclosure in this respect.

Figure 9A:
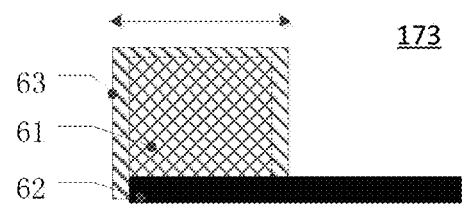
FIG. 9A is an exemplary side view of a first polarization control element.
Figure 9B:
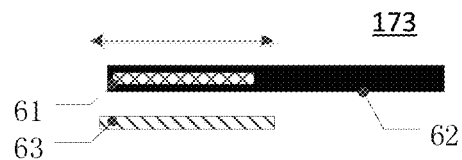
FIG. 9B is exemplary top view of the first polarization control element as illustrated in FIG. 9A.

For example, FIG. 9A and FIG. 9B illustrate an exemplary arrangement of the first polarization control element 173. For example, FIG. 9A and FIG. 9B are respectively a side view and a top view of the first polarization control element 173. For example, as illustrated in FIG. 9A, the first polarization control element 173 may include a ½ wave plate 61 and a first analyzer 63. For example, the ½ wave plate 61, for example, may be provided on a translation device 62 (for example, an electrical guide rail), and the ½ wave plate 61 may move along the translation device 62 when required. For example, the ½ wave plate 61 can allow the polarization direction of the linear polarized light, which is incident onto the ½ wave plate 61, to rotate 90 degrees, that is, the polarization direction of the linear polarized light, which is outputted from the ½ wave plate 61, is perpendicular to the polarization direction of the linear polarized light which is incident onto the ½ wave plate 61. For example, the first analyzer 63 may be provided at the side, which is closer to the light-exiting surface of the first polarization control element 173, of the translation device 62, and the first analyzer 63, for example, the first analyzer 63 may be fixedly provided at the first end (for example, the left side as illustrated in FIG. 9B) of the first polarization control element 173. For example, the first analyzer 63 may be configured to pass through the second linear polarized light and to block the first linear polarized light, and the first analyzer 63, for example, may include a linear polarizer.

Figure 9C:
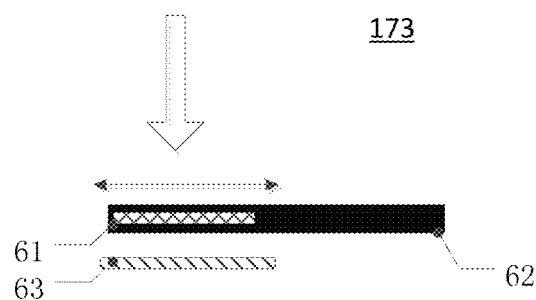
FIG. 9C is a schematic diagram of the first polarization control element, which is in a first state, as illustrated in FIG. 9A.

For example, FIG. 9C illustrates a schematic diagram of the first polarization control element 173 in the first state, in this case, the ½ wave plate 61 is provided at the first end of the first polarization control element 173. The light which is incident onto the first polarization control element 173 is firstly pass through the ½ wave plate 61, and then is incident onto the first analyzer 63. For example, as illustrated in FIG. 9C, the polarization direction of the first polarized light which is incident onto the first polarization control element 173 rotates 90 degrees after passing through the ½ wave plate 61 (that is, the first polarized light is converted into the second polarized light). Therefore, the first polarized light which is incident onto the first polarization control element 173 can pass through the first polarization control element 173. For example, the polarization direction of the second polarized light which is incident onto the first polarization control element 173 rotates 90 degrees after passing through the ½ wave plate 61 (that is, the second polarized light is converted into the first polarized light). Therefore, the second polarized light which is incident onto the first polarization control element 173 cannot pass through the first polarization control element 173 because the blocking of the first polarization control element 173.

Figure 9D:
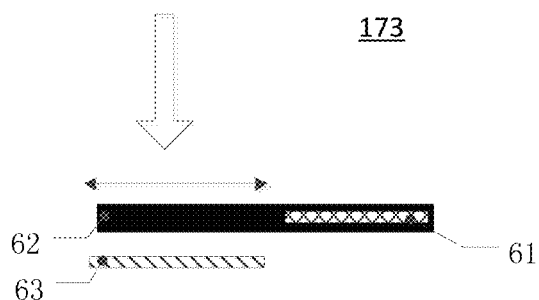
FIG. 9D is a schematic diagram of the first polarization control element, which is in a second state, as illustrated in FIG. 9A.

For example, FIG. 9D illustrates a schematic diagram of the first polarization control element 173 in the second state. In this case, because the ½ wave plate 61 is moved to the second end (for example, the right side of the first polarization control element 173 as illustrated in FIG. 9D) of the first polarization control element 173 by the translation device 62, the light which is incident onto the first polarization control element 173 is directly incident onto the first analyzer 63. Because the first analyzer 63 is configured to pass through the second linear polarized light and to block the first linear polarized light, the first polarization control element 173 may pass through the second linear polarized light and may block the first linear polarized light in the second state.

Figure 10:
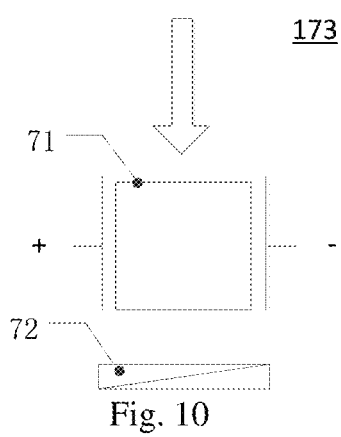
FIG. 10 is a schematic diagram of another first polarization control element.

For example, FIG. 10 illustrates another exemplary arrangement of the first polarization control element 173. For example, as illustrated in FIG. 10, the first polarization control element 173 may include an electro-optic crystal 71, a second analyzer 72 and electrical plates at two sides of the electro-optic crystal 71.

For example, the electro-optic crystal 71 may be provided at the side, which is closer to the light incidence surface, of the first polarization control element 173, and the second analyzer 72 may be opposite to the electro-optic crystal 71, and the second analyzer 72 is provided at the side, which is closer to the light exiting surface, of the first polarization control element 173. For example, the second analyzer 72 may be configured to pass through the second linear polarized light and to block the first linear polarized light, but the embodiment of the present disclosure is not limited to this case. The analyzer, for example, may include a linear polarizer.

For example, in the case where an appropriate voltage (for example, a half wave voltage) is applied onto the electro-optic crystal 71 through the electrical plates, the electro-optic crystal 71 is equivalent to a ½ wave plate. In this case, the polarization direction of the linear polarized light rotates 90 degrees after passing through the electro-optic crystal 71. In the case where no voltage is applied onto the electro-optic crystal 71, the polarization direction of the linear polarized light remains unchanged after passing through the electro-optic crystal 71. For example, specific arrangement of the electro-optic crystal 71 may be set according to specific implementation demands, and no limitations will be given to the embodiment of the present disclosure in this respect. The electro-optic crystal 71, for example, may be potassium dihydrogen phosphate, ammonium dihydrogen phosphate, lithium niobate, or lithium tantalate.

For example, at the first time T1, the half wave voltage is applied onto the electro-optic crystal 71 via the electrical plates, and the electro-optic crystal 71 may allow the polarization direction of the linear polarized light passing through the electro-optic crystal 71 to rotate 90 degrees, that is, the electro-optic crystal 71 may covert the first polarized light into the second polarized light, and may convert the second polarized light into the first polarized light. Because the second analyzer 72 is configured to pass through the second linear polarized light and to block the first linear polarized light, at the first time T1, the first polarization control element 173 may pass through the first linear polarized light and block the second linear polarized light, that is, the first polarization control element 173 is in the first state in this case.

For example, at the second time T2, no voltage is applied onto the electro-optic crystal 71, and the polarization direction of the linear polarized light after passing through the electro-optic crystal 71 remains unchanged. Because the second analyzer 72 is configured to pass through the second linear polarized light and to block the first linear polarized light, at the second time T2, the first polarization control element 173 may pass through the second linear polarized light and may block the first linear polarized light, that is, the first polarization control element 173 is in the second state in this case.

For example, an exemplary method for the display system 100 provided by the present embodiment to obtain the intensity of the light of the first image and the intensity of the light of the surrounding image will be described in detail in the following with reference to FIG. 8.

For example, the intensity of the light of the first image before passing through the first polarizer 171 may include the intensity $I_{ds}$ of the first polarized light and the intensity $I_{dp}$ of the second polarized light, and the light intensity $I_{ds}$ of the first polarized light of the first image and the light intensity $I_{dp}$ of the second polarized light of the first image may be considered as equal to half of the intensity $I_d$ of the light of the first image, that is, $I_{ds}=I_{dp}=I_d/2$. After passing through the first polarizer 171, the intensity of the light of the first image may only include the intensity $I_{ds}$ of the first polarized light because of the function of the first polarizer 171, and therefore, the intensity of the light of the first image, which is outputted at the display side of the display image export device 110, only includes the intensity of $I_{ds}$ the first polarized light.

For example, the intensity of the surrounding image which is outputted at the display side of the display image export device 110 may include the sum of the intensity $I_{hs}$ of the first polarized light and the intensity $I_{hp}$ of the second polarized light, and the light intensity $I_{hs}$ of the first polarized light of the surrounding image and the light intensity $I_{hp}$ of the second polarized light of the surrounding image may be considered as equal to half of the intensity $I_h$ of the light of the surrounding image, that is, $I_{hs}=I_{hp}=I_h/2$.

For example, at the first time T1, the first polarization control element 173 may pass through the first linear polarized light and block the second linear polarized light, and therefore, the light intensity $I_1$ which are collected by the light intensity detection device 131 is the sum of the light intensity $I_{ds}$ of the first polarized light of the first image and the light intensity $I_{hs}$ of the first polarized light of the surrounding image, that is, $I_1=I_{ds}+I_{hs}$. At the second time T2, the first polarization control element 173 may pass through the second linear polarized light and block the first linear polarized light, and therefore, the light intensity $I_2$ which are collected by the light intensity detection device 131 is the light intensity $I_{hp}$ of the second polarized light of the surrounding image, that is, $I_2=I_{hp}$. Therefore, the intensity $I_d$ ($I_d=2I_1-2I_2$) of the light of the first image and the intensity $I_h$ ($I_h=2I_2$) of the light of the second image can be obtained based on the light intensities collected by the light intensity detection device 131 at the first time T1 and the second time T2

For example, because the transmittance and the reflectivity of the half-transparent and half-reflective surfaces 124 are known or may be measured, the intensities of the light of the first image and the light of the surrounding image outputted at the display side of the region, which is corresponding to an eye of an user, of the display image export device 110 may be obtained based on the intensity $I_d$ of the light of the first image and the intensity $I_h$ of the light of the surrounding image outputted at the display side of the region, which is corresponding to the light intensity detection device 131, of the display image export device 110, and the image contrast matching information between the first image and the surrounding image may be obtained based on the above-mentioned information (for example, may be obtained by the computing device 134).

For example, the controller 135 may be configured to adjust the intensity of the light of the first image outputted by the display element 133 based on the image contrast matching information, which is obtained by the computing device 134, between the surrounding image and the first image, and therefore, the intensity of the light of the first image outputted to the display image import device 120 can be controlled, and the contrast ratio between the first image and the surrounding image can be optimized. For example, in the case where the display system 100 further includes the light intensity adjustment device 190, the intensity of the light of the surrounding image which is outputted at the display side of the display image export device 110 may be adjusted by controlling the transmittance of the light intensity adjustment device 190.

For example, in the present embodiment, by providing the first polarizer and the first polarization control element, the light intensity detection device may obtain the sum of the light intensity of the first polarized light of the first image and the first polarized light of the surrounding image which are outputted at the display side of the display image export device, and the light intensity of the second polarized light of the surrounding image at different time, and therefore, the display system can obtain the intensity of the light of the first image and the intensity of the light of the surrounding image, and can optimize the contrast ratio between the first image and the surrounding image based on the obtained intensity of the light of the first image and the obtained intensity of the light of the surrounding image.

Sixth Embodiment

The present embodiment provides a display system 100, the display system 100 is similar to the embodiment as illustrated in FIG. 8 (i.e., the fifth embodiment), and the difference is that the first polarizer 171 is provided at the opposite side of the display image export device 110 and the first polarizer 171 is opposite to the light intensity detection device 131 (the display image export device 110 at least partially overlaps with the light intensity detection device 131 in the direction perpendicular to the display image import device), and the first polarizer 171 is not provided at the display side of the display image import device 120 and opposite to the light-incident surface of the display image import device 120, that is, the display system provided by the present embodiment may adopt the display system as illustrated in FIG. 8, and allow the first polarizer 171 to be provided at the opposite side of the display image export device 110 and to be opposite to the light intensity detection device 131. For example, for the sake of clarity, the present embodiment only describes the difference with respect to the fifth embodiment, and no further description will be given to the content similar to the fifth embodiment.

Figure 11:
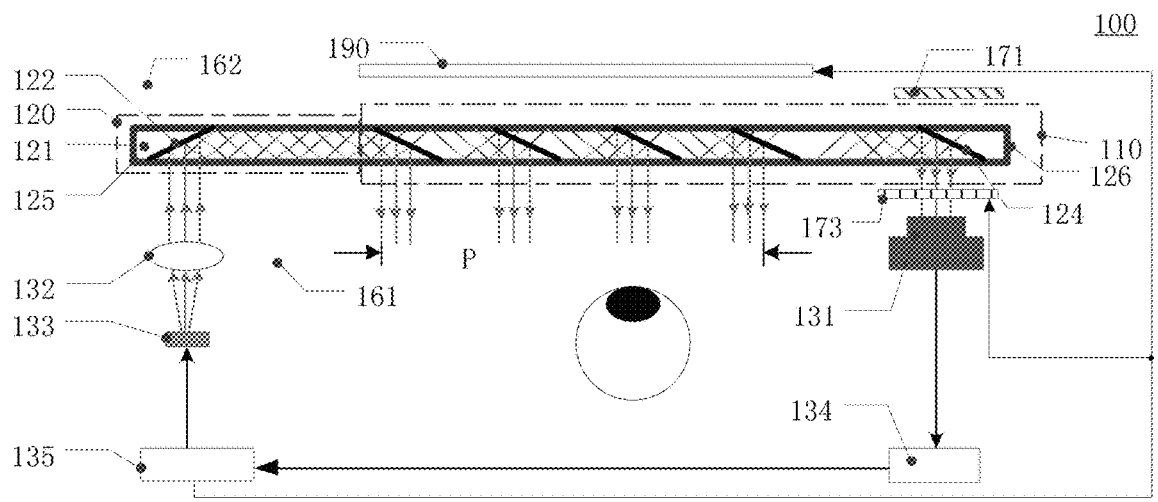
FIG. 11 is a cross-sectional view of a display system provided by a sixth embodiment.

For example, FIG. 11 illustrates a cross-sectional view of the display system 100 provided by the sixth embodiment. For example, the light transmission control device as illustrated in FIG. 11 may adopt the first polarization control element 173 as illustrated in FIG. 9 or FIG. 10. For example, in the case where the display system 100 further includes the light intensity adjustment device 190, the first polarizer 171 may be closer to the display image export device 110 compared with the light intensity adjustment device 190, but the embodiment of the present disclosure is not limited to this case.

For example, the intensity of the light of the first image at the display side of the display image export device 110 may include the intensity $I_{ds}$ of the first polarized light and the intensity $I_{dp}$ of the second polarized light, and the light intensity $I_{ds}$ of the first polarized light of the first image and the light intensity $I_{dp}$ of the second polarized light of the first image may be considered as equal to half of the intensity $I_d$ of the light of the first image, that is, $I_{ds}=I_{dp}=I_d/2$.

For example, before passing through the first polarizer 171, the intensity of the surrounding image may include the sum of the intensity $I_{hs}$ of the first polarized light and the intensity $I_{hp}$ of the second polarized light, and the intensity $I_{hs}$ of the first polarized light of the surrounding image and the intensity $I_{hp}$ of the second polarized light of the surrounding image may be considered as equal to half of the intensity $I_h$ of the light of the surrounding image, that is, $I_{hs}=I_{hp}=I_h/2$. After passing through the first polarizer 171, the intensity of the light of the surrounding image may only include the intensity $I_{hs}$ of the first polarized light because of the function of the first polarizer 171. Therefore, the intensity of the light of the surrounding image which is outputted at the display side of the display image export device 110 only includes the intensity $I_{hs}$ of the first polarized light.

For example, at the first time T1, the first polarization control element 173 may pass through the first linear polarized light and block the second linear polarized light, and therefore, the light intensity $I_1$ which is collected by the light intensity detection device 131 is the sum of the light intensity $I_{ds}$ of the first polarized light of the first image and the light intensity $I_{hs}$ of the first polarized light of the surrounding image, that is, $I_1=I_{ds}+I_{hs}$. At the second time T2, the first polarization control element 173 may pass through the second linear polarized light and block the first linear polarized light, and therefore, the light intensity $I_2$ which is collected by the light intensity detection device 131 is the light intensity $I_{dp}$ of the second polarized light of the first image, that is, $I_2=I_{dp}$. Therefore, the intensity $I_d$ ($I_d=2I_2$) of the light of the first image and the light intensity $I_h$ ($I_h=2I_1-2I_2$) of the light of the second image may be obtained based on the light intensities collected by the light intensity detection device 131 at the first time T1 and the second time T2.

For example, in the present embodiment, by providing the first polarizer at the opposite side of the display image export device and providing the first polarization control element at the display side of the display image export device, the light intensity detection device may obtain the sum of the light intensities of the first polarized light of the first image and the first polarized light of the surrounding image which are outputted at the display side of the display image export device, and the light intensity of the second polarized light of the first image at different time. Therefore, the display system can obtain the intensity of the light of the first image and the intensity of the light of the surrounding image, and the display system can optimize the contrast ratio between the first image and the surrounding image based on the obtained intensity of the light of the first image and the obtained intensity of the light of the surrounding image.

Seventh Embodiment

The present embodiment provides a display system 100, the display system 100 is similar to the embodiment as illustrated in FIG. 8 (i.e., the fifth embodiment), and the difference is that the display system 100 (the light transmission control device of the display system 100) further includes a second polarizer 172, and the second polarizer 172 may be configured to allow the light of the surrounding image in the display image export device 110 to be the second linear polarized light. The polarization direction of the second linear polarized light is perpendicular to the polarization direction of the first linear polarized light.

Figure 12A:
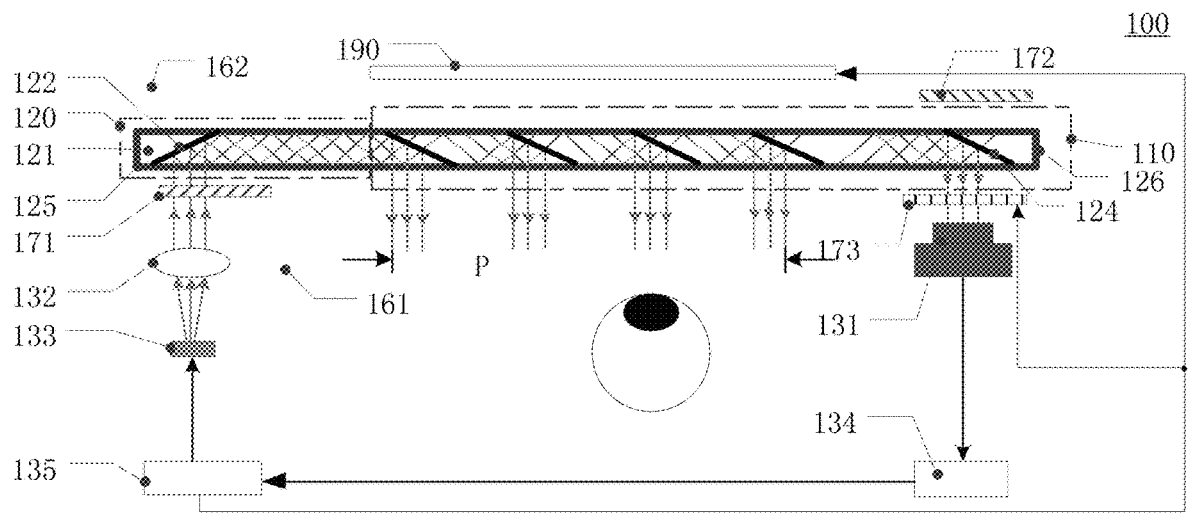
FIG. 12A is a cross-sectional view of a display system provided by a seventh embodiment.

For example, FIG. 12A illustrates a cross-sectional view of the display system 100 provided by the seventh embodiment. For example, the light transmission control device as illustrated in FIG. 12A may adopt the first polarization control element 173 as illustrated in FIG. 9 or FIG. 10. For example, as illustrated in FIG. 12A, in the case where the display system 100 further includes the light intensity adjustment device 190, and the second polarizer 172 may be closer to the display image export device 110 compared with the light intensity adjustment device 190, but the embodiment of the present disclosure is not limited to this case.

For example, before passing through the first polarizer 171, the intensity of the light of the first image may include the intensity $I_{ds}$ of the first polarized light and the intensity $I_{dp}$ of the second polarized light, and the light intensity $I_{ds}$ of the first polarized light of the first image and the light intensity $I_{dp}$ of the second polarized light of the first image may be considered as equal to half of the intensity $I_d$ of the light of the first image, that is, $I_{ds}=I_{dp}=I_d/2$; after passing through the first polarizer 171, the intensity of the light of the first image may only include the intensity $I_{ds}$ of the first polarized light because of the function of the first polarizer 171. Therefore, the intensity of the light of the first image which is outputted at the display side of the display image export device 110 only include the intensity $I_{ds}$ of the first polarized light.

For example, before passing through the second polarizer 172, the intensity of the surrounding image may include the sum of the intensity $I_{hs}$ of the first polarized light and the intensity $I_{hp}$ of the second polarized light, and the light intensity $I_{hs}$ of the first polarized light of the surrounding image and the light intensity $I_{hp}$ of the second polarized light of the surrounding image may be considered to be equal to half of the intensity $I_h$ of the light of the surrounding image, that is, $I_{hs}=I_{hp}=I_h/2$. After passing through the second polarizer 172, the intensity of the light of the surrounding image may only include the intensity $I_{hp}$ of the second polarized light because of the function of the second polarizer 172. Therefore, the intensity of the light of the surrounding image which is outputted at the display side of the display image export device 110 only includes the intensity $I_{hp}$ of the second polarized light.

For example, at the first time T1, the first polarization control element 173 may pass through the first linear polarized light and block the second linear polarized light, and therefore, the light intensity $I_1$ which is collected by the light intensity detection device 131 is the light intensity $I_{ds}$ of the first polarized light of the first image, that is, $I_1=I_{ds}$. At the second time T2, the first polarization control element 173 may pass through the second linear polarized light and block the first linear polarized light, and therefore, the light intensity $I_2$ which is collected by the light intensity detection device 131 is the light intensity $I_{hp}$ of the second polarized light of the surrounding image, that is, $I_2=I_{hp}$. Therefore, the intensity $I_d$ ($I_d=2I_1$) of the light of the first image and the light intensity $I_h$ ($I_h=2I_2$) of the light of the second image can be obtained based on the light intensities collected by the light intensity detection device 131 at the first time T1 and the second time T2.

Figure 12B:
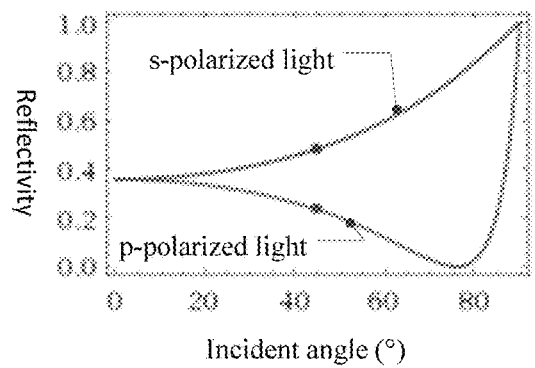
FIG. 12B is schematic diagram illustrating reflectivity curves for s-polarized light and p-polarized light of a film.

For example, FIG. 12B illustrates the reflectivity of a film (for example, a dielectric film) with respect to s-polarized light and p-polarized light at different incident angles. For example, as illustrated in FIG. 12B, in the case where the film is not a special designed film, the reflectivity of the film (for example, a dielectric film) with respect to s-polarized light and p-polarized light changes significantly along with the change of the incident angle. Therefore, in the case where the light of the first image/the surrounding image in the display image import device 120 and the display image export device 110 is the natural light, the impact of the difference, between the reflectivity of the film to the s-polarized light and the reflectivity of the film to the p-polarized light, to the display uniformity of the display system 100 need to be considered when designing the display system 100, and thus the design and manufacture of the film is difficult. For example, for the display system 100 provided by the present embodiment, the light of the first image propagated in the display image export device 110 only includes, for example, the s-polarized light, and the light of the surrounding image propagated in the display image export device 110 only includes, for example, the p-polarized light, and therefore, the difficulty of the design and manufacture of the film is lowered.

For example, in the present embodiment, in the case where the display image export device includes a plurality of half-transparent and half-reflective surfaces 124, the half-transparent and half-reflective surface 124 which is opposite to the light intensity detection device 131 may be replaced by a polarization beam combiner. For example, the polarization beam combiner may be provided in the display image export device 110 through coating film. For example, the reflectivity of the polarization beam combiner to the s-polarized light may be high (for example, the reflectivity is greater than 90%); meanwhile, the transmittance of the polarization beam combiner to the p-polarized light may also be high (for example, the transmittance is greater than 90%). Therefore, compared with the half-transparent and half-reflective surface 124, the polarization beam combiner may increase the intensities of the light of the first image and the light of the surrounding image outputted at the display side of the region, which is corresponding to the light intensity detection device 131, of the display image export device 110; in this case, the accuracy of the values of the intensity of the light of the first image and the intensity of the light of the surrounding image which are obtained by the light intensity detection device 131 may be increased, and the display effect of the display system 100 can be further improved.

For example, in the present embodiment, by providing the first polarizer at the display side of the display image import device, providing the second polarizer at the opposite side of the display image export device, and providing the first polarization control element at the display side of the display image export device, the light intensity detection device may obtain the light intensity of the first polarized light of the first image which is outputted at the display side of the display image export device and the light intensity of the second polarized light of the surrounding image which is outputted at the display side of the display image export device at different time. Therefore, the display system can obtain the intensity of the light of the first image and the intensity of the light of the surrounding image, and the display system can optimize the contrast ratio between the first image and the surrounding image based on the obtained intensity of the light of the first image and the obtained intensity of the light of the surrounding image.

For example, for the sake of clarity, all the display systems provided by the first embodiment to the seventh embodiment are implemented as a monocular type augmented reality display device, but the embodiment of the present disclosure is not limited to this case. For example, according to specific implementation demands, the display systems provided by the first embodiment to the seventh embodiment may also be implemented as a binocular type augmented reality display device. For example, specific arrangements of the binocular type augmented reality display device may refer to the monocular type augmented reality display device, and no further descriptions will be given here.

Eighth Embodiment

Figure 13:
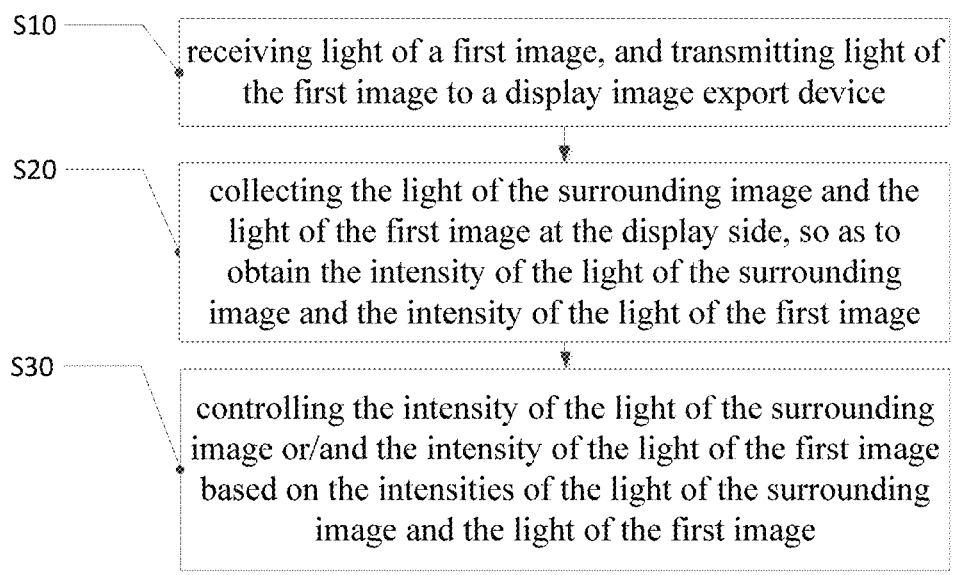
FIG. 13 is an exemplary flow chart of an image display method provided by an eighth embodiment.

The present embodiment provides an image display method. For example, as illustrated in FIG. 13, the image display method includes the following step.

Step S10: receiving light of a first image, and transmitting light of the first image to a display image export device, in which the display image export device includes a display side and an opposite side which is opposite to the display side; the first image is displayed at the display side; and at least part of the display image export device is configured to be at least partially transparent, so as to be able to receive at least part of a surrounding image for the opposite side at the display side of the display image export device.

Step S20: collecting the light of the surrounding image and the light of the first image at the display side, so as to obtain the intensity of the light of the surrounding image and the intensity of the light of the first image.

Step S30: controlling the intensity of the light of the surrounding image and/or the intensity of the light of the first image based on the intensities of the light of the surrounding image and the light of the first image.

For example, the example of the specific method of the step S10 and the step S20 may refer to the embodiments for the display system, and no further descriptions will be given here.

For example, in the step S30, firstly, the image contrast matching information between the surrounding image and the first image may be obtained based on the intensities of the light of the surrounding image and the light of the first image; and then the intensities of the light of the surrounding image and/or the light of the first image, which are outputted at the display side, may be controlled based on the image contrast matching information.

For example, specific method of obtaining the image contrast matching information between the surrounding image and the first image based on the intensity of the light of the surrounding image and the intensity of the light of the first image and the specific method of controlling the intensity (intensities) of the light of the surrounding image and/or the light of the first image, which are outputted at the display side based on the image contrast matching information may refer to the embodiments for the display system, and no further descriptions will be given here.

Ninth Embodiment

The present embodiment provides an image display method, and the image display method can be used to adjust the light intensity (for example, the intensity of the light of the surrounding image and/or the intensity of the light of the first image) of any one of the above-mentioned display systems.

For example, the image display method may control the intensity of the light of the surrounding image and/or the intensity of the light of the first image (for example, the intensity (intensities) of the light of the surrounding image and/or the light of the first image which are view by human eye) based on the intensities of the light of the surrounding image and the light of the first image which are collected at the display side of the display image export device (for example, the region corresponding to the light intensity detection device). Therefore, the contrast ratio between the surrounding image and the first image can be optimized, and the display effect can be improved.

Figure 14:
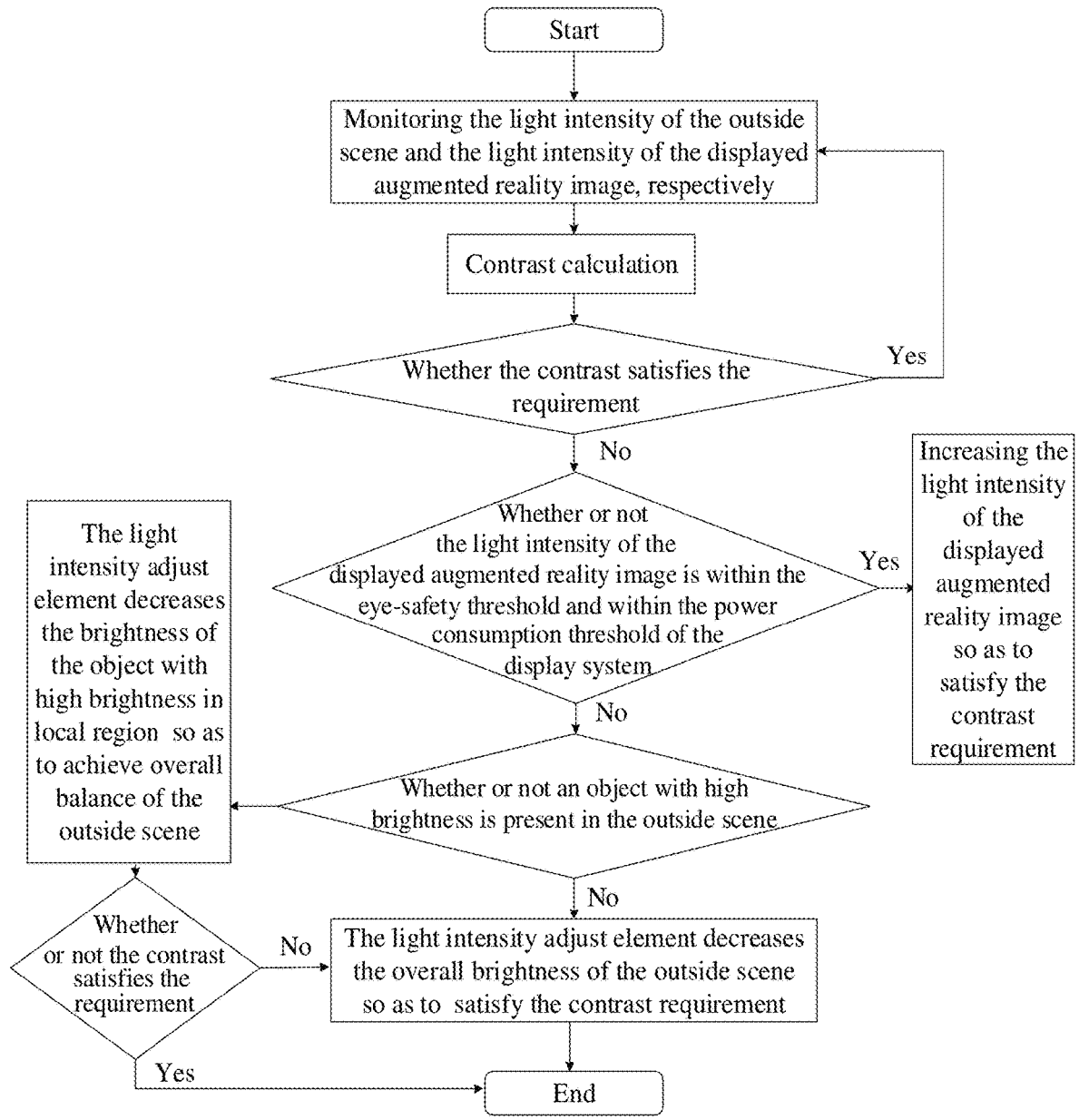
FIG. 14 is an exemplary flow chart of an image display method provided by a ninth embodiment.

For example, FIG. 14 illustrates an exemplary flow chart of the image display method. The image display method and the principle of improving the image contrast will be described in detail in the following with reference to FIG. 14.

For example, as illustrated in FIG. 14, firstly the light intensity of the outside scene and the light intensity of the displayed augmented reality image (that is, the intensity of the light of the surrounding image and the intensity of the light of the first image) may be monitored. For example, the light intensity of the outside scene and the light intensity of the displayed augmented reality image may be monitored through obtaining the intensity of the light of the surrounding image and the intensity of the light of the first image with the light intensity detection device. For example, the monitor frequency of the light intensity of the outside scene and the light intensity of the displayed augmented reality image may be set according to specific implementation demands, and no limitations will be given to the embodiment of the present disclosure in this respect. For example, the method to obtain the intensity of the light of the surrounding image and the intensity of the light of the first image may refer to the embodiments for the display system, and no further descriptions will be given here.

For example, as illustrated in FIG. 14, after the intensity of the light of the surrounding image and the intensity of the light of the first image are obtained, the image contrast matching information between the surrounding image and the first image may be obtained based on the intensity of the light of the surrounding image and the intensity of the light of the first image. For example, the image contrast matching information between the surrounding image and the first image may be obtained through calculating of the contrast ratio with the computing device. For example, specific method for calculating the image contrast matching information between the surrounding image and the first image may refer to the embodiments for the display system, and no further descriptions will be given here.

For example, as illustrated in FIG. 14, after the image contrast matching information between the surrounding image and the first image is obtained, whether or not the image contrast between the surrounding image and the first image satisfies actual application demand can be determined. For example, the method to determine whether or not the image contrast between the surrounding image and the first image satisfies actual application demand may refer to the embodiments for the display system, and no further descriptions will be given here.

For example, as illustrated in FIG. 14, if it is determined that the image contrast between the surrounding image and the first image satisfies actual application demand, no adjustment to the intensity (for example, the intensity of the light of the surrounding image and/or the intensity of the light of the first image) of the light outputted by the display system is carried out, and the system (for example, the display system) is directly back to the light intensity monitor state.

For example, as illustrated in FIG. 14, if it is determined that the image contrast between the surrounding image and the first image does not satisfy actual application demand, firstly, determining the amount of the adjustment needed for allowing the intensity of the light of the first image to satisfy the image contrast requirement, and determining whether or not the intensity of the light of the first image (i.e., the light intensity of the displayed augmented reality image) after adjustment is within the eye-safety threshold and within the power consumption threshold of the display system.

For example, as illustrated in FIG. 14, in the case where the intensity of the light of the first image (i.e., the light intensity of the displayed augmented reality image) after adjustment is within the eye-safety threshold and the power consumption threshold of the display system, the image contrast requirement may be satisfied by increasing the intensity of the light of the first image (i.e., the light intensity of the displayed augmented reality image). For example, in the case where the intensity of the light of the first image (i.e., the light intensity of the displayed augmented reality image) after adjustment is not within the eye-safety threshold or the power consumption threshold of the display system, firstly, maximizing the intensity of the light of the first image provided that the intensity of the light of the first image is within the eye-safety threshold and the power consumption threshold of the display system, and then executing the following steps.

For example, as illustrated in FIG. 14, if it is determined that the image contrast between the surrounding image and the first image does not satisfy actual application demand, and the intensity of the light of the first image is already maximized, determining whether or not a local region (i.e., the object with high brightness in the local region in FIG. 14) with high brightness is presented in the surrounding image (i.e., the outside scene image).

For example, as illustrated in FIG. 14, if it is determined that no local region with high brightness is present in the surrounding image, the image contrast requirement may be satisfied through decreasing the overall intensity of the light of the surrounding image which is outputted at the display side of the display image export device by decreasing the overall transmittance of the light intensity adjustment device (i.e., the light intensity adjust element as illustrated in FIG. 14).

Figure 15:
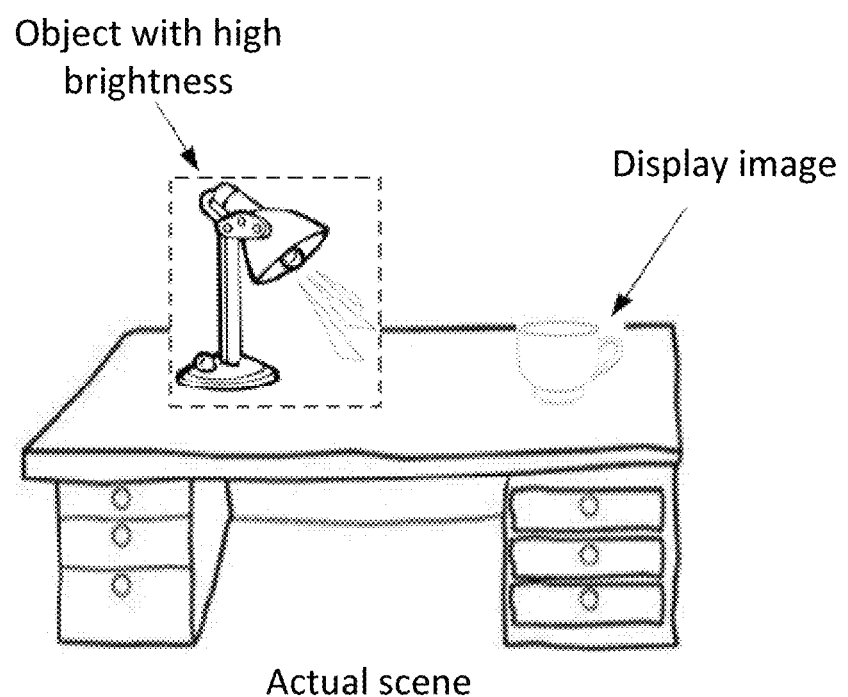
FIG. 15 is an application scene diagram of the image display method as illustrated in FIG. 14.

For example, as illustrated in FIG. 14, if it is determined that the local region with high brightness is present in the surrounding image, firstly, decreasing the light intensity (for example, provided that the contrast ratio of the surrounding image is guaranteed) of the local region with high brightness in the surrounding image which is outputted at the display side of the display image export device through decreasing the transmittance of a local region of the light intensity adjustment device (i.e., the light intensity adjust element as illustrated in FIG. 14); and then, determining whether or not the surrounding image and the first image satisfies the image contrast requirement after the light intensity of the local region with high brightness in the surrounding image is decreased. For example, as illustrated in FIG. 14, if it is determined that the image contrast requirement is satisfied, finishing the light intensity adjustment of the present period, and allowing the display system to return to the light intensity monitor state. For example, as illustrated in FIG. 14, if it is determined that the image contrast requirement is not satisfied, decreasing the overall intensity of the light of the surrounding image which is outputted at the display side of the display image export device through decreasing the overall transmittance of the light intensity adjustment device (i.e., the light intensity adjust element as illustrated in FIG. 14), such that the image contrast requirement can be satisfied; in this case, after the image contrast requirement is satisfied, finishing the light intensity adjustment of the present period, and allowing the display system to return to the light intensity monitor state For example, the image display method as illustrated in FIG. 14 is described in detail in the following with reference to the application scene as illustrated in FIG. 15. For example, the image (i.e., the surrounding image), corresponding to the actual scene, as illustrated in FIG. 15 includes a desk and a desk lamp. The displayed augmented reality image (i.e., the first image) to be superimposed with the actual scene includes a tea cup. For example, because the desk lamp in the actual scene is an object with high brightness in a local region, the desk lamp in the actual scene may decrease the contrast ratio between the display image and the actual scene image which are view by human eye, when observing the tea cup in augmented reality image via the display system. In order to increase the contrast ratio between the display image and the actual scene image, the light intensity of the object with high brightness in a local region (i.e., the desk lamp) may be decreased. Compared with the overall decreasing of the light intensity of the actual scene image, decreasing of the light intensity of the objects with high brightness in a local region may achieve better image contrast.

For example, the following steps may be adopted to decrease the light intensity of the object with high brightness in a local region (i.e., the desk lamp), such that the contrast ratio between the display image and the actual scene image can be optimized.

For example, obtaining the light intensity of the outside scene image and the light intensity of the displayed augmented reality image by the light intensity detection device, and calculating the image contrast (for example, the image contrast matching information) based on the light intensity of the outside scene and the intensity of the light of the displayed augmented reality image. For example, if the image contrast does not satisfy the contrast requirement, the following steps may be executed: firstly, increasing the brightness of the display image provided that the brightness of the display image is within the eye-safety threshold and the power consumption threshold; secondly, if the image contrast still does not satisfy the contrast requirement, reducing the light intensity of the outside scene through adjusting the transmittance of the light intensity adjustment device (i.e., the light intensity adjust element).

For example, the following steps may be executed when decreasing the light intensity of the outside scene image. Firstly, whether or not an object with high brightness in a local region is present in the outside scene image is determined. If it is determined that the object with high brightness in a local region is present, firstly, decreasing the light intensity of the object with high brightness in a local region in the outside scene image through decreasing the transmittance of the partially region, which is corresponding to the object with high brightness in a local region, of the light intensity adjustment device (i.e., the light intensity adjust element), so as to achieve overall brightness balance between the brightness of the desk lamp in the outside scene image and the outside scene image. If the image contrast requirement is still not satisfied, the light intensity of the outside scene image may be further reduced by decreasing the overall transmittance of the light intensity adjustment device (i.e., the light intensity adjust element), so as to allow the brightness of the outside scene image and the brightness of the displayed augmented reality image to be able to satisfy the image contrast requirement. Therefore, better contrast can be achieved for the display image (i.e., the tea cup), and the display effect may be improved.

For example, FIG. 14 and FIG. 15 describe the image display method provided by the present embodiment by taking the case that the intensity of the light of the surrounding image is greater than the intensity of the light of the first image (that is, the intensity of the light of the surrounding image need to be decreased), but the present embodiment is not limited to this case. For example, the image display method can also be applied in the cases that the intensity of the light of the surrounding image is smaller than the intensity of the light of the first image (that is, the intensity of the light of the surrounding image need to be increased), and specific methods may refer to FIG. 14, FIG. 15 and related descriptions, and no further descriptions will be given here.

Embodiments of the present disclosure provides a display system and an image display method, and the contrast ratio between the display image and the outside scene image can be optimized through obtaining the intensity of the light of the surrounding image and the intensity of the light of the first image.

It is apparent that the presented disclosure may be changed and modified by those skilled in the art without departure from the spirit and scope of the disclosure, if the above-mentioned changes and modifications of the presented disclosure belong to the scope of the claims of the presented disclosure and its equivalent technologies, the presented disclosure is intended to include the above changes and modifications.

What are described above is related to the illustrative embodiments of the disclosure only and not limitative to the scope of the disclosure; the scopes of the disclosure are defined by the accompanying claims.

The application claims priority to Chinese patent application No. 201710495394.6, filed on Jun. 26, 2017, the entire disclosure of which is incorporated herein by reference as part of the present application.

What is claimed is:

1. A display system, comprising:
   a display image export device comprising a display side and an opposite side which is opposite to the display side,
   wherein at least part of the display image export device is configured to be at least partially transparent, so as to, at the display side of the display image export device, receive at least part of a surrounding image for the opposite side; and
   the display image export device is further configured to display a first image at the display side;
   a display image import device, which is configured to receive light of the first image, and to transmit the light of the first image to the display image export device; and
   a light intensity control device, which is configured to control at least one of an intensity of light of the surrounding image and an intensity of the light of the first image,
   wherein the light intensity control device comprises:
   a light intensity detection device, which is provided at the display side of the display image export device, and is configured to collect the light of the surrounding image and the light of the first image; and
   a light transmission control device, which is configured to control the intensity of the light of the surrounding image and/or the intensity of the light of the first image, the light of the surrounding image and the light of the first image being incident onto the light intensity detection device at different times, so as to allow the light intensity detection device to obtain the intensity of the light of the surrounding image and the intensity of the light of the first image.

2. The display system according to claim 1, wherein the light transmission control device comprises:
   a first polarizer, which is configured to convert the light of the first image or the light of the surrounding image in the display image export device to be first linear polarized light; and
   a first polarization control element, which is provided between the display image export device and the light intensity detection device,
   wherein the first polarization control element is configured to transmit the first linear polarized light and to block second linear polarized light, so as to allow the first linear polarized light to be incident onto the light intensity detection device, or
   the first polarization control element is configured to transmit second linear polarized light and to block the first linear polarized light, so as to allow the second linear polarized light to be incident onto the light intensity detection device; and
   a polarization direction of the second linear polarized light is perpendicular to a polarization direction of the first linear polarized light.

3. The display system according to claim 2, wherein the light transmission control device further comprises a second polarizer;
   the first polarizer is provided at the display side, the first polarizer at least partially overlaps with the display image import device in a direction perpendicular to the display image import device, and the first polarizer is configured to convert the light of the first image in the display image export device to be the first linear polarized light; and the second polarizer is provided at the opposite side, the second polarizer at least partially overlaps with the light intensity detection device in the direction perpendicular to the display image import device, and the second polarizer is configured to convert the light of the surrounding image in the display image export device to be the second linear polarized light.

4. The display system according to claim 3, further comprising a polarization beam combiner, wherein the polarization beam combiner at least partially overlaps with the light intensity detection device in the direction perpendicular to the display image import device; and the polarization beam combiner is configured to transmit at least part of the second linear polarized light and to reflect at least part of the first linear polarized light.

5. The display system according to claim 1, wherein a position of the light transmission control device is one of following positions:

a first position that is at the opposite side of the display image export device and at least partially overlaps with the light intensity detection device in a direction perpendicular to the display image import device; and a second position that is at a display side of the display image import device, and at least partially overlaps with a light-incident surface of the display image import device in a direction perpendicular to the display image import device.

6. The display system according to claim 5, wherein the light transmission control device comprises:

an electrical transmittance adjustment element made of a polymer dispersed liquid crystal material, or an electrical polarized light generation element, wherein the electrical polarized light generation element is configured to be in a polarized light generating state or a polarized light non-generating state.

7. The display system according to claim 1, wherein the light intensity control device further comprises a computing device; and the computing device is configured to obtain image contrast matching information between the surrounding image and the first image based on the intensity of the light of the surrounding image which is obtained by the light intensity detection device and the intensity of the light of the first image which is obtained by the light intensity detection device.

8. The display system according to claim 7, wherein the light intensity detection device is configured to obtain an average value of the intensity of the light of the surrounding image and an average value of the intensity of the light of the first image; and the computing device is configured to obtain the image contrast matching information based on the average value of the intensity of the light of the surrounding image and the average value of the intensity of the light of the first image.

9. The display system according to claim 7, wherein the light intensity detection device is configured to obtain the surrounding image and the first image, so as to obtain the intensity of the light of the surrounding image and the intensity of the light of the first image at pixels of the light intensity detection device where the light of the surrounding image and the light of the first image are incident; and the computing device is configured to obtain the image contrast matching information based on the intensity of the light of the surrounding image and the intensity of the light of the first image which are obtained by at least part of the pixels.

10. The display system according to claim 7, wherein the light intensity control device further comprises a controller, wherein the controller is configured, based on the image contrast matching information, to control the intensity of the light of the first image outputted to the display image import device.

11. The display system according to claim 10, wherein the light intensity control device further comprises a light intensity adjustment device;

the light intensity adjustment device is provided at the opposite side of the display image export device; and the controller is further configured to control light transmittance of the light intensity adjustment device based on the image contrast matching information.

12. The display system according to claim 1, further comprising one or more lenses, wherein the one or more lenses are configured to transmit the first image, and allow the light of the first image to be outputted into the display image import device.

13. The display system according to claim 12, further comprising a display element, wherein the one or more lenses are configured to collimate the light of the first image outputted by the display element into parallel light, and then transmit the light of the first image into the display image import device as the parallel light.

14. The display system according to claim 1, wherein the display image import device and the display image export device are combined with each other, or are integrally formed, so as to obtain an optical waveguide body;

the display image import device comprises a reflective surface; and the display image export device comprises one half-transparent and half-reflective surface or a plurality of half-transparent and half-reflective surfaces arranged in parallel.

15. An image display method, comprising:

receiving light of a first image and transmitting the light of the first image to a display image export device, wherein the display image export device comprises a display side and an opposite side which is opposite to the display side;

the first image is displayed at the display side; and at least part of the display image export device is configured to be at least partially transparent, so as to, at the display side of the display image export device, receive at least part of a surrounding image for the opposite side;

controlling at least one of an intensity of light of the surrounding image and an intensity of the light of the first image;

controlling, by a light transmission control device, the intensity of the light of the surrounding image and/or the intensity of the light of the first image, the light of the surrounding image and the light of the first image being incident onto the light intensity detection device at different times; and collecting, by a light intensity detection device at the display side of the display image export device, the light of the surrounding image and the light of the first image at the display side, so as to obtain the intensity of the light of the surrounding image and the intensity of the light of the first image.

16. The image display method according to claim 15, further comprising:
controlling the intensity of the light of the surrounding image and/or the intensity of the light of the first image based on the intensity of the light of the surrounding image which is connected and the intensity of the light of the first image which is collected.

17. The image display method according to claim 16, wherein image contrast matching information between the surrounding image and the first image is obtained based on the intensity of the light of the surrounding image which is connected and the intensity of the light of the first image which is collected; and
the intensity of the light of the surrounding image which is outputted at the display side and/or the intensity of the light of the first image which is outputted at the display side are controlled based on the image contrast matching information.

* * * * *